(12) United States Patent
Ishikawa

(10) Patent No.: US 7,209,165 B2
(45) Date of Patent: Apr. 24, 2007

(54) VIBRATION CORRECTION FOR IMAGE SENSING APPARATUS

(75) Inventor: Yoshikazu Ishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 717 days.

(21) Appl. No.: 10/669,288

(22) Filed: Sep. 24, 2003

(65) Prior Publication Data

US 2004/0056963 A1 Mar. 25, 2004

(30) Foreign Application Priority Data

Sep. 24, 2002 (JP) ............................. 2002-276487

(51) Int. Cl.
*H04N 5/228* (2006.01)
(52) U.S. Cl. ........................ 348/208.99; 348/207.99; 396/55
(58) Field of Classification Search ................ 382/260, 382/263; 348/208.99, 207.99; 396/255
See application file for complete search history.

(56) References Cited

U.S. PATENT DOCUMENTS 6,122,446 A * 9/2000 Satoh ........................... 396/52
6,229,960 B1 * 5/2001 Konishi ....................... 396/55
6,263,162 B1 * 7/2001 Yamazaki et al. ............. 396/55

FOREIGN PATENT DOCUMENTS

JP 2000-39637 2/2000
JP 2000-66259 3/2000

* cited by examiner

*Primary Examiner*—David Ometz
*Assistant Examiner*—Usman Khan
(74) *Attorney, Agent, or Firm*—Morgan & Finnegan LLP

(57) ABSTRACT

The present invention provides an image sensing apparatus which comprises a vibration detector that detects vibration of the apparatus, a vibration correction unit that corrects vibration of an image, and a control unit that calculates a vibration correction signal based on a vibration detection signal from the vibration detector and controls the vibration correction unit. The control unit comprises a first detection unit that detects whether a first frequency obtained from the vibration detection signal and used for calculating the vibration correction signal falls within a first frequency band, a second detection unit that detects whether a second frequency obtained from the vibration detection signal and used for calculating the vibration correction signal falls within a second frequency band, a variable high frequency band pass unit that changes the pass band for the vibration detection signal on the high frequency side depending on detection results of the first and second detection unit, and a calculation unit that calculates the vibration correction signal from a vibration frequency of the vibration detection signal passed through the variable high frequency band pass unit and outputs the vibration correction signal to the vibration correction unit.

7 Claims, 18 Drawing Sheets

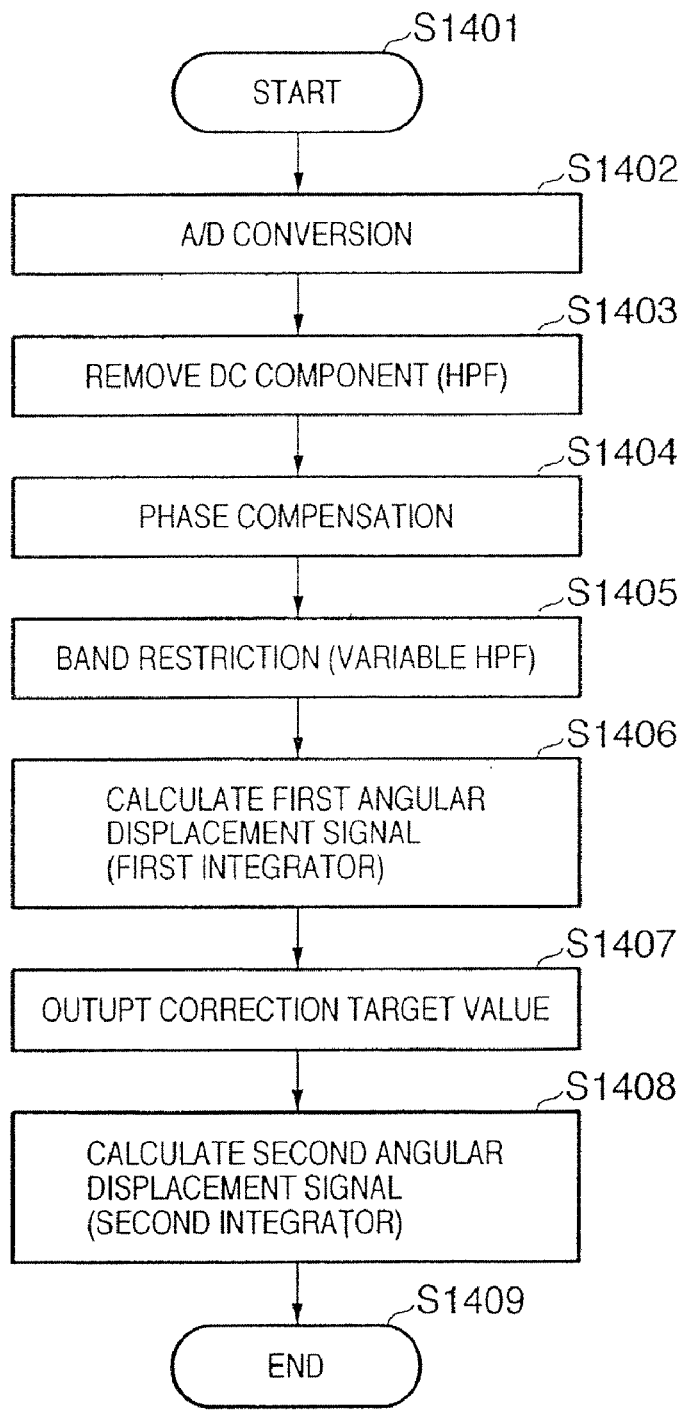

VIBRATION CORRECTION FOR IMAGE SENSING APPARATUS

FIELD OF THE INVENTION

The present invention relates to a vibration correcting function which corrects vibration of an image sensing apparatus represented by a video camera, etc., when sensing an image.

BACKGROUND OF THE INVENTION

An image sensing apparatus such as a small video camera has a disadvantage that, because the apparatus shakes due to so-called camera shake or vibration when sensing an image, a fuzzy image is output or recorded. Therefore, as measures for eliminating such a disadvantage, an image sensing apparatus provided with a vibration correcting function which reduces influences of camera shake has been developed and already commercialized.

There are various methods for detecting vibrations such as camera shake, for example, a method of directly detecting motion of an apparatus using an angular velocity sensor or angular acceleration sensor, and an electronic detection method for detecting motion of an image by comparing between images of successive fields or frames among image signals. On the other hand, there are means for correcting vibration, for example, one provided with a vibration correction optical system which optically adjusts an angle of the image sensing optical axis in a direction in which camera shake is cancelled and so-called electronic correcting means which electronically selects a range to be actually recorded or output (extraction range) of a sensed image by an image sensing element.

A conventional example using an angular velocity sensor as vibration detecting means and using a vibration correction optical system as vibration correcting means will be explained below.

FIG. 9 is a conceptual diagram of an image sensing optical system including a vibration correction optical system.

In FIG. 9, an image sensing optical system 700 includes a fixed lens 701 which is fixed to a lens barrel (not shown), a zoom lens 702 which moves on a central axis c' of the image sensing optical system 700 in horizontal direction as indicated by an arrow a, a shift lens 703 which moves two-dimensionally within the plane (direction indicated by an arrow b) which is perpendicular to the central axis c', a focus lens 704 which corrects the movement of a focal plane due to a focusing function and movement of the zoom lens 702, and an image sensing element 705 which forms an image of an object, arranged in the foregoing order, and is further provided with an actuator 706 which drives the shift lens 703 and a position detection sensor 707 which detects the position of the shift lens 703 at predetermined positions near the shift lens 703.

As shown in FIG. 10A, when camera shake, etc., causes the optical axis c to deviate from the central axis c' of the image sensing optical system 700, producing a displacement angle θ, it is possible, by driving the actuator 706 and moving the shift lens 703 to the position indicated by 703' as shown in FIG. 10B, to optically align the optical axis c which is deviated on the fixed lens 701 side with respect to the shift lens 703 with the central axis c' of the image sensing optical system on the image sensing element 705 side with respect to the shift lens 703. Therefore, it is possible to correct the optical displacement angle θ produced by camera shake as described above through the above described operation and form an image of the object on the image sensing element 705 as an incident beam with vibration corrected by moving the shift lens 703 based on the camera shake.

Then, an example of a configuration of a conventional image sensing apparatus shown in pp4–6, and FIGS. 2 and 3 of Japanese Patent Laid-Open No. 2000-39637, and pp3–4 and FIG. 1 of Japanese Patent Laid-Open No. 2000-66259 is shown in FIG. 11.

In FIG. 11, the conventional image sensing apparatus is constructed of the aforementioned image sensing optical system 700 including the vibration correction system, an image sensing element 705 on which an optical image of an object is formed through the image sensing optical system 700, a camera signal processing circuit 1519 which applies predetermined signal processing to the output from the image sensing element 705, an angular velocity sensor 1501 which detects vibration of the apparatus, a high pass filter (hereinafter simply referred to as "HPF") 1502 which removes a direct current (DC) component from the output of the angular velocity sensor 1501, a first amplifier 1503 which amplifies the output from the HPF 1502 by a predetermined amount, a microcomputer 1505 which applies predetermined signal processing to the output from the first amplifier 1503, a D/A converter 1515 which converts the output from the microcomputer 1505 to an analog signal, a driving circuit 1517 which issues a driving signal of the actuator 706 included in the image sensing optical system 700, a second amplifier 1518 which amplifies the output from the position detection sensor 707 by a predetermined amount and an adder 1516 which adds up the output from the D/A converter 1515 and the output from the second amplifier 1518.

In this configuration, the angular velocity sensor 1501 outputs a vibration detection signal based on vibration of the apparatus, the vibration detection signal HPF 1502 removes the DC component from it, and then the first amplifier 1503 amplifies it by a predetermined amount. That is, the configuration from the angular velocity sensor 1501 to the first amplifier 1503 causes the vibration detection signal from the angular velocity sensor 1501 to convert to a vibration detection signal processed with predetermined band restriction and amplification and the vibration detection signal is input to the microcomputer 1505 which controls the image sensing apparatus. The vibration detection signal input to the microcomputer 1505 is subjected to predetermined signal processing to calculate a control amount of vibration correction (hereinafter simply referred to as a "correction target value"). This predetermined signal processing will be described later.

Then, the correction target value calculated by the microcomputer 1505 is converted from a digital signal to an analog signal at the D/A converter 1515, input to the adder 1516 and added to a feedback signal from the position detection sensor 707 of the shift lens 703 supplied through the second amplifier 1518. The output signal from the adder 1516 is supplied to the driving circuit 1517 and the driving circuit 1517 issues a driving signal to the actuator 706 and drives the shift lens 703. This allows the displacement θ to be optically corrected as explained in FIGS. 10A and 10B, causing the object image to be formed on the image sensing element 705 as a beam with vibration corrected.

Then, the electric signal photoelectrically converted by the image sensing element 705 is led through a camera signal processing circuit 1519 and supplied to a recording/reproducing section (not shown), etc.

Next, the signal processing in the microcomputer 1505 will be explained.

FIG. 12 shows a signal processing system in the microcomputer 1505, including an A/D converter 1506 which converts the input vibration detection signal from an analog signal to a digital signal, an HPF 1507 which removes a DC component from the output of the A/D converter 1506, a phase compensation section 1508 which phase-compensates the output of the HPF 1507, a variable HPF 1509 which restricts the pass band of the output of the phase compensation section 1508, a first integrator 1510 which integrates the output of the variable HPF 1509, a frequency detection section 1511 which detects the vibration frequency from the output of the A/D converter 1506 through the HPF 1507 and a vibration correction frequency control section 1514 which decides the vibration state of the apparatus from the output of the frequency detection section 1511 and controls the frequency for correcting the vibration. The frequency detection section 1511 includes a second integrator 1512 which integrates the output of the A/D converter 1506 which has passed through the HPF 1507 and a frequency calculation section 1513 which calculates the frequency from this integrated output.

In the above described configuration, the input vibration detection signal is converted at the A/D converter 1506 from an analog vibration signal to a digital vibration signal and then remove the DC component generated through A/D conversion, etc., at the HPF 1507. Therefore, the cutoff frequency of the HPF 1507 is sufficiently low. Then, at the phase compensation section 1508, the vibration detection signal from which the DC component is removed is phase-compensated for a phase delay in a high frequency band in such a way that the phase characteristic becomes flat up to a predetermined frequency band, then subjected to predetermined pass band restriction and phase compensation which will be described later at the variable HPF 1509 whose cutoff frequency is variable, further subjected to integration processing at the first integrator 1510 to convert the angular velocity signal to an angular displacement signal whereby a correction target value is obtained and supplied to the D/A converter 1515.

Furthermore, the output of the HPF 1507 is input to the phase compensation section 1508 as shown in FIG. 12 and at the same time also input to the frequency detection section 1511, where the vibration frequency of the apparatus is detected. The detection of the vibration frequency will be described later.

Then, the detected vibration frequency is input to the vibration correction frequency control section 1514, where a cutoff frequency is selected from table data corresponding to the vibration frequency from the frequency detection section 1511 and set in the variable HPF 1509. More specifically, control is performed in such a way that the cutoff frequency remains at a specified value or the cutoff frequency is shifted gradually from the cutoff frequency of a specified value to the high frequency side or the cutoff frequency is returned gradually from a state in which it has been shifted to the high frequency side to the cutoff frequency of a specified value (hereinafter simply referred to as "adaptive control") and the signal is phase-compensated for a phase delay in the high frequency band which cannot be phase-compensated by the phase compensation section 1508.

Then, the detection of a vibration frequency will be explained.

As shown in FIG. 12, the frequency detection section 1511 includes the second integrator 1512 and frequency calculation section 1513. The second integrator 1512 integrates the output of the A/D converter 1506 which has passed through the HPF 1507, thereby converts the angular velocity signal to an angular displacement signal and calculates a second angular displacement signal. Based on the above described calculated second angular displacement signal, the frequency calculation section 1513 calculates the frequency and detects the vibration frequency of the apparatus.

Next, the calculation of an angular displacement signal for frequency detection and calculation of the frequency will be explained.

FIG. 13 shows an input/output characteristic of the second integrator 1512 which calculates an angular displacement signal to calculate the vibration frequency of the apparatus, which shows the frequency on the abscissa and gain on the ordinate.

As is apparent from FIG. 13, the output of the second integrator 1512 has an integration characteristic in which the output is greater in a low frequency band and smaller in a high frequency band. Therefore, the high frequency band which is mixed with the output of the HPF 1507 input to the second integrator 1512 attenuates and the angular displacement signal of the low frequency band at a large amplitude level is calculated.

Next, the operation of the frequency calculation section 1513 which calculates a vibration frequency of the apparatus from the calculated angular displacement signal will be explained using FIG. 14.

FIG. 14 is a flow chart showing frequency detection processing carried out in the microcomputer 1505 and rough description of this processing will be given first.

In step S1101 in this figure, frequency detection is started and in step S1102, the number of increase/decrease turning points of the vibration signal calculated by the second integrator 1512 is counted first. Then, in next step S1103 the count value is stored in a register and in step S1104 the count value is compared with a predetermined first threshold (th1). If the count value is equal to or lower than the predetermined first threshold (th1), the process moves on to step S1105, where it calculates a first frequency, then moves on to step S1108 and finishes the frequency detection.

On the other hand, if the count value is greater than the first threshold (th1) in step S1104, the process moves on to step S1106, where it compares the number of times (count value>th1) occurs consecutively with a predetermined second threshold (th2). As a result, if the number of times (count value>th1) is equal to or lower than the second threshold (th2), the process moves on to step S1108, where it finishes the frequency detection. If the number of times (count value>th1) is greater than the second threshold (th2), the process moves on to step S1107, where it calculates a second frequency and then moves on to step S1108 and finishes the frequency detection.

Then, the specific operation of the frequency detection will be explained using FIG. 14.

As the method for frequency detection, the number of increase/decrease turning points of the vibration signal per a unit time is counted and the counted number is regarded as the detected frequency.

In step S1101, frequency detection which is carried out at a period (e.g., 500 [ms]) longer than a vibration correction control processing period (e.g., 1 [ms]) is started. First in step S1102, the number of increase/decrease turning points of an angular displacement signal is counted whereby the increase/decrease subjected to the counting is a difference between previous sampling data and latest sampling data of an angular displacement signal sampled at a predetermined period (e.g., 10 [ms]) which exceeds a predetermined threshold. Then in next step S1103, the counted value is stored in a register. This register is a shift register constructed in such a way as to be able to store a plurality of sample data (n=x), shift data every time the count value is updated and erase the oldest data.

Then in step S1104, the latest count value (number of increase/decrease turning points) is compared with the first threshold (th1). For example, when the first threshold (th1) is set to "12" and the latest count value is "10", the updated count value as a result of comparison becomes th1 or less (NO) and the process moves on to step S1105. Then, in this step S1105, the frequency per a unit time is calculated from the number of increase/decrease turning points "10" which is the latest count value stored in the register. The number of increase/decrease turning points in one period is 2 and 1 [Hz], that is, since the frequency is ½ of the number of increase/decrease turning points, that is "10/2=5" and a frequency of 5 [Hz] is calculated. After the frequency is calculated, the process moves on to step S1108 and finishes the frequency detection processing.

Furthermore, in above step S1104, if the latest count value (number of increase/decrease turning points) is higher than th1, for example if the first threshold (th1) is "12" and latest count value is "16", the updated count value is higher than th1 (YES). In this case, the process moves on to step S1106, where the number of times that the comparison condition (count value>th1) in step S1104 holds consecutively is compared with the second threshold (th2). This processing is carried out to improve the reliability of counting because when the count in step S1102 increases sporadically due to noise, etc., the comparison condition (count value>th1) in step S1104 is satisfied.

When the number of times the comparison condition (count value>th1) in step S1104 is satisfied is equal to or lower than a predetermined threshold (th2) (No in step S1106), the process moves on to step S1108, where it finishes the processing of frequency detection. That is, the detected frequency is not updated.

On the other hand, when the number of times the comparison condition (count value>th1) in step S1104 is satisfied is greater than a predetermined threshold (th2) ((count value)>th1))>th2 holds (YES in step S1106), the process moves on to step S1107, where the latest count value stored in the register is compared with count values stored in the past and adopts a minimum value as the detected frequency. More specifically, assuming that the count values stored in the register are for example, 16, 18 and 18, that is, n=3, the microcomputer compares them and selects 16 as a minimum value. In this case, the frequency is 16/2=8 as described above and this means that a frequency 8 [Hz] is calculated.

The minimum value is regarded as the detection frequency because the camera shake frequency relatively tends to concentrate on a low frequency (several [Hz] to 10 [Hz]) and the cutoff frequency of the variable HPF 1509 is controlled based on the frequency detected assuming the use on a vehicle, etc., and therefore this is intended to reduce sacrificing of the vibration correction effect on the low frequency side to a lowest possible level even when the vibration correction frequency is shifted to the high frequency side. Then, the microcomputer moves on to step S1108 and finishes the processing of frequency detection.

Next, the operation of the vibration correction frequency control section 1514 which determines the vibration state of the apparatus according to the detected vibration frequency and sets the cutoff frequency of the variable HPF 1509 will be explained below.

A predetermined frequency threshold (fth) is set in the vibration correction frequency control section 1514 for the vibration frequency detected by the frequency detection section 1511. Therefore, the vibration correction frequency control section 1514 compares the detected vibration frequency with the predetermined frequency threshold (fth), decides whether the detected vibration frequency is higher than fth or not, and performs adaptive control, based on the determination result, such as to decide whether to continue to use the predetermined specified value as the cutoff frequency of the variable HPF 1509 or shift it from the specified value to the high frequency side gradually or return it from the state in which it has been shifted to the high frequency side to the specified value gradually.

Next, the frequency characteristic of the variable HPF 1509 when adaptive control is performed will be explained using FIG. 15A and FIG. 15B. FIG. 15A shows a gain characteristic and FIG. 15B shows a phase characteristic.

The variable HPF 1509 has a frequency characteristic up to the normal camera shake frequency band (e.g., approximately 3 to 8 [Hz]) indicated by a gain 1201 and phase 1202 set for a predetermined cutoff frequency fc and the cutoff frequency remains at the specified value fc. However, when the apparatus is fixed to a vehicle, etc., and the vehicle moves and when a frequency (e.g., approximately 20 [Hz]) exceeding the frequency of camera shake is detected, the vibration correction frequency control section 1514 controls so that the cutoff frequency of the variable HPF 1509 is shifted to the high frequency side gradually based on the detection frequency. The frequency characteristic when the cutoff frequency of the variable HPF 1509 is shifted gradually to the high frequency side is gain 1201' and phase 1202' in the case of the cutoff frequency fc' shown in FIG. 15A and FIG. 15B. Furthermore, when the detected frequency changes from the frequency exceeding the frequency of camera shake to a normal frequency of camera shake, the vibration correction frequency control section 1514 controls so that the cutoff frequency fc' of the variable HPF 1509 is gradually shifted to fc.

Thus, it is possible to make the cutoff frequency of the variable HPF 1509 variable through adaptive control. Since the phase characteristic when the cutoff frequency is shifted to the high frequency side (fc') is a leading phase (1202'), phase compensation for the high frequency band which will be described later is performed.

Then, phase compensation for a phase delay of a high frequency band will be explained.

FIGS. 16A and 16B show a frequency characteristic from the angular velocity sensor 1501 to the output of the vibration correction system and reference numeral 1301 in FIG. 16A shows a gain characteristic and reference numeral 1302 in FIG. 16B shows a phase characteristic.

In FIGS. 16A and 16B, a frequency band 1303 shows a vibration correctable band and it is for example, frequency f1=1 Hz, f2=20 Hz and f3=30 Hz. The range of a band 1304 where the gain attenuates shows a band in which vibration correction is disabled. In the bands between frequencies f2 and f3, the phase shows a lag in the high frequency band in the vibration correctable range as shown in FIG. 16B. Therefore, the phase characteristic of the variable HPF 1509 which changes as the cutoff frequency of the variable HPF 1509 is shifted to the high frequency side (leading phase) makes it possible to phase-compensate the high frequency band in which a phase delay occurs and improves the vibration suppression effect of a high frequency band equal to or higher than the normal camera shake frequency by bringing the phase characteristic closer to flat.

The vibration signal that passes through the variable HPF 1509 which is adaptively controlled in this way is integrated by the first integrator 1510 whereby an angular displacement signal is output as a correction target value.

Next, the processing whereby the aforementioned content is executed in the microcomputer 1505 will be explained with reference FIGS. 17 and 18.

FIG. 17 is a flow chart of the vibration correction processing executed in the microcomputer 1505 and is the processing for interrupting the overall processing of the microcomputer 1505 in a predetermined period (e.g., 1 [ms]).

In FIG. 17, the process start by an interruption in step S1401 and an analog vibration detection signal captured by the A/D converter 1506 is converted to a digital vibration detection signal in step S1402 first. Then, in next step S1403, the HPF 1507 removes the DC component generated through A/D conversion. Then in next step S1404, the phase compensation section 1508 phase-compensates for a predetermined band of the vibration detection signal whose DC component has been removed. Then, in step S1405, the variable HPF 1509 applies predetermined band restriction on the vibration detection signal undergone predetermined phase compensation.

In next step S1406, the first integrator 1510 integrates the vibration detection signal undergone the predetermined band restriction to calculate a first angular displacement signal. Then, in next step S1407, the first angular displacement signal is output from the microcomputer 1505 as the correction target value and in next step S1408, the second integrator 1512 integrates the output of the HPF 1507 to calculate a second angular displacement signal for frequency detection. Then, in step S1409, the microcomputer 1505 finishes interruption to the overall processing under its control.

Next, with reference to the flow chart in FIG. 18, the processing of calculating a frequency from the second angular displacement signal calculated for frequency detection, deciding the vibration state of the apparatus and controlling the cutoff frequency of the variable HPF 1509 will be explained. This processing is carried out at a period different from the period of the processing in FIG. 17 (e.g., 500 [ms]).

In FIG. 18, the processing of detecting a frequency is started at step S1451 and in step S1452, the frequency calculation section 1513 calculates the vibration frequency of the apparatus based on the second angular displacement signal calculated in step S1408 in FIG. 17. The method of detecting the frequency is as described with reference to FIG. 14.

Then, in step S1453, the detected frequency is compared with a predetermined threshold (fth). When the detected frequency is higher than fth (YES), the microcomputer 1505 decides that the high frequency is detected and the process moves on to step S1454, where a cutoff frequency of the variable HPF 1509 is set based on the frequency detected in step S1452. In this case, the cutoff frequency is shifted gradually to the high frequency side. After setting the cutoff frequency of the variable HPF 1509, the process moves on to step S1456 and finishes the frequency detection and cutoff frequency setting processing.

Furthermore, when the comparison result in step S1453 is equal to or lower than the threshold (NO), the microcomputer 1505 decides that a normal vibration frequency is detected and the process moves on to step S1455, where a specified cutoff frequency during normal vibration correction is set in the variable HPF 1509 and the process moves on to step S1456 and finishes the frequency detection and cutoff frequency setting processing. The cutoff frequency set by the variable HPF 1509 is updated when the next frequency detection processing is executed and the cutoff frequency of the variable HPF 1509 is controlled as appropriate. The image sensing apparatus provided with the aforementioned vibration correction function allows image sensing with a normal handheld camera or vibration correction when mounted on a vehicle, etc.

The vibration correction function mounted on the image sensing apparatus performs similar corrections in at least two directions; vertical direction and horizontal direction. Since corrections in these two directions are similar operations, for simplicity of explanation of the conventional example, an operation in one direction was explained to represent them. Further, the driving circuit and actuator that drive the zoom lens 702 and focus lens 704, mechanism and control for exposure control are omitted in the above explanation.

According to the above described conventional example, when an image sensing apparatus such as a video camera provided with a vibration correction function is placed on a table on a ship, etc., for image sensing in an operating environment in which vibration exerted on the apparatus consists of a mixture of a low frequency vibration of reeling of the ship and a high frequency vibration due to vibration of the engine transmitted through structures of the ship, the frequency detection section 1511 detects the low frequency preferentially as explained in the flow chart in FIG. 14, failing to detect the high frequency and detect a vibration frequency of the high frequency band.

Thus, even when a mixture of low frequency and high frequency vibration which is correctable by camera shake correction is applied to the apparatus, the vibration correction frequency control section 1514 determines that the vibration is of only the low frequency, tries to adjust adaptive control for making a cutoff frequency of the variable HPF 1509 variable to the low frequency and the microcomputer 1505 outputs a correction target value for vibration correction which matches the low frequency. This prevents sufficient vibration correction of the high frequency band due to a phase delay of the high frequency band, showing a defect that the vibration suppression performance of the high frequency band is inferior to that of the low frequency band.

This reflects in such a phenomenon that when for example, an image with black and white stripe patterns is sensed and a comparison is made between a case where there is vibration of a low frequency band and a case where there is vibration of a high frequency band, the boundary between black and white appears blurred when there is vibration of a high frequency band, resulting in a defect that resolution appears deteriorated with the presence of vibration of the high frequency band.

SUMMARY OF THE INVENTION

The present invention has been made in consideration of the above situation, and has as its object to allow more appropriate vibration correction even when vibration of a low frequency and vibration of a high frequency are mixed.

According to the present invention, the foregoing object is attained by providing an image sensing apparatus comprising:

a vibration detector that detects vibration of the apparatus;

a vibration correction unit that corrects vibration of an image caused by vibration of the apparatus; and a control unit that calculates a vibration correction signal based on a vibration detection signal from the vibration detector and controls the vibration correction unit, wherein the control unit comprises:

a first detection unit that detects whether a first frequency obtained from the vibration detection signal and used for calculating the vibration correction signal falls within a first frequency band which is equals to or lower than a predetermined frequency;

a second detection unit that detects whether a second frequency obtained from the vibration detection signal and used for calculating the vibration correction signal falls within a second frequency band exceeding the predetermined frequency or not;

a variable high frequency band pass unit that changes the pass band for the vibration detection signal on the high frequency side depending on cases 1) where the first frequency falls within the first frequency band and the second frequency does not fall within the second frequency band, 2) where the first frequency does not fall within the first frequency band and the second frequency falls within the second frequency band, and 3) where the first frequency falls within the first frequency band and the second frequency falls within the second frequency band simultaneously; and a calculation unit that calculates the vibration correction signal from a vibration frequency of the vibration detection signal passed through the variable high frequency band pass unit and outputs the vibration correction signal to the vibration correction unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 17 is a flow chart showing the processing executed in the microcomputer of the conventional image sensing apparatus.

DETAILED DESCRIPTION OF THE PREFERRED EMBODIMENTS

Preferred embodiments of the present invention will be described in detail in accordance with the accompanying drawings.

[First Embodiment]

Figure 1:
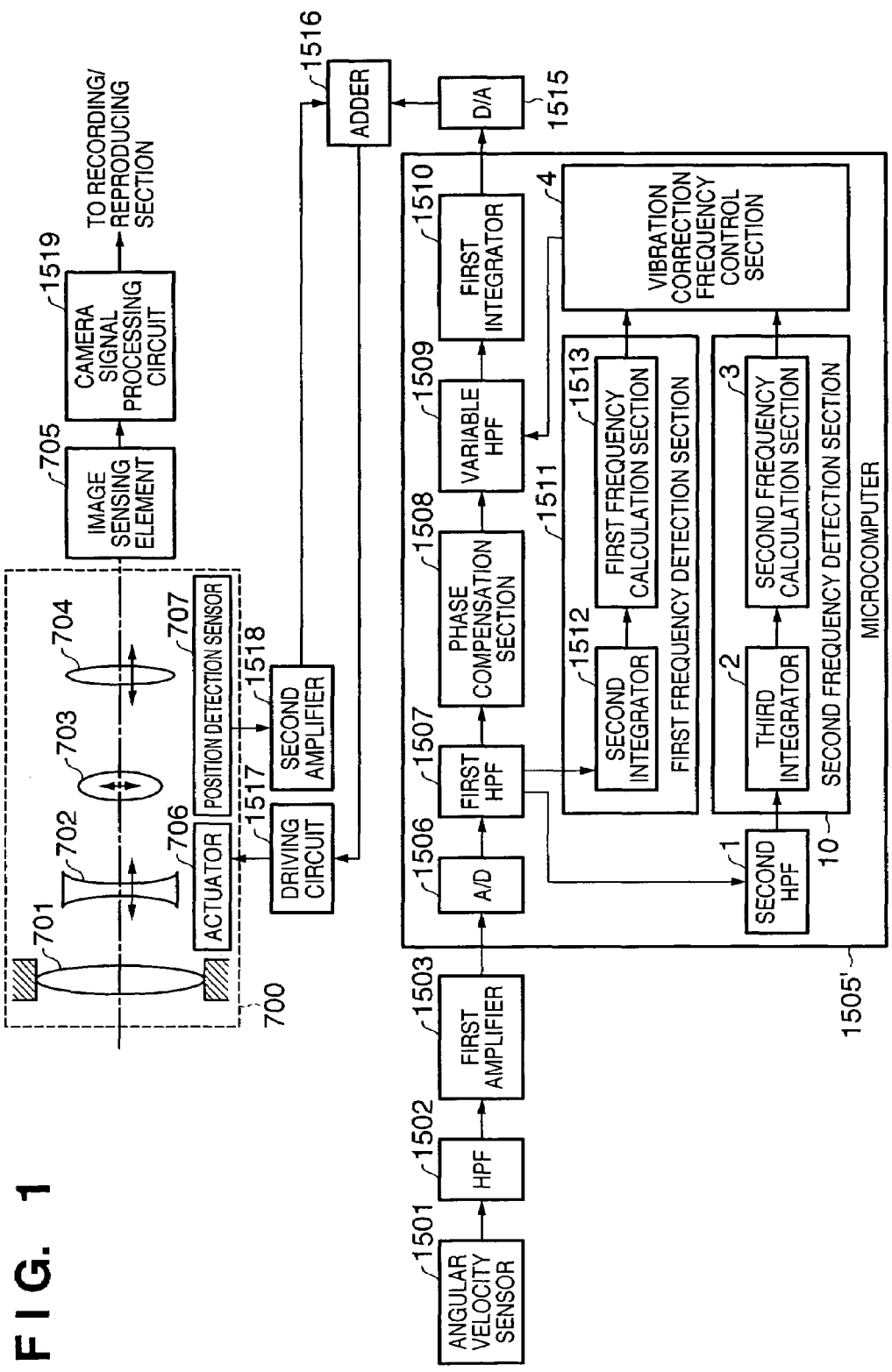
FIG. 1 is a block diagram showing a configuration of an image sensing apparatus according to a first embodiment of the present invention.

FIG. 1 is a block diagram showing a configuration of an image sensing apparatus according to a first embodiment of the present invention.

In FIG. 1, reference numeral 1 denotes a second HPF which allows a predetermined high frequency component of a vibration detection signal to pass; 2, a third integrator which calculates an angular displacement signal from the output of the second HPF 1; 3, a second frequency calculation section which calculates a frequency; and 4, a vibration correction frequency control section which determines a vibration state from the vibration frequency and controls a frequency for correcting vibration. The third integrator 2 and the second frequency calculation section 3 are included in a second frequency detection section 10 which detects a second frequency.

Figure 11:
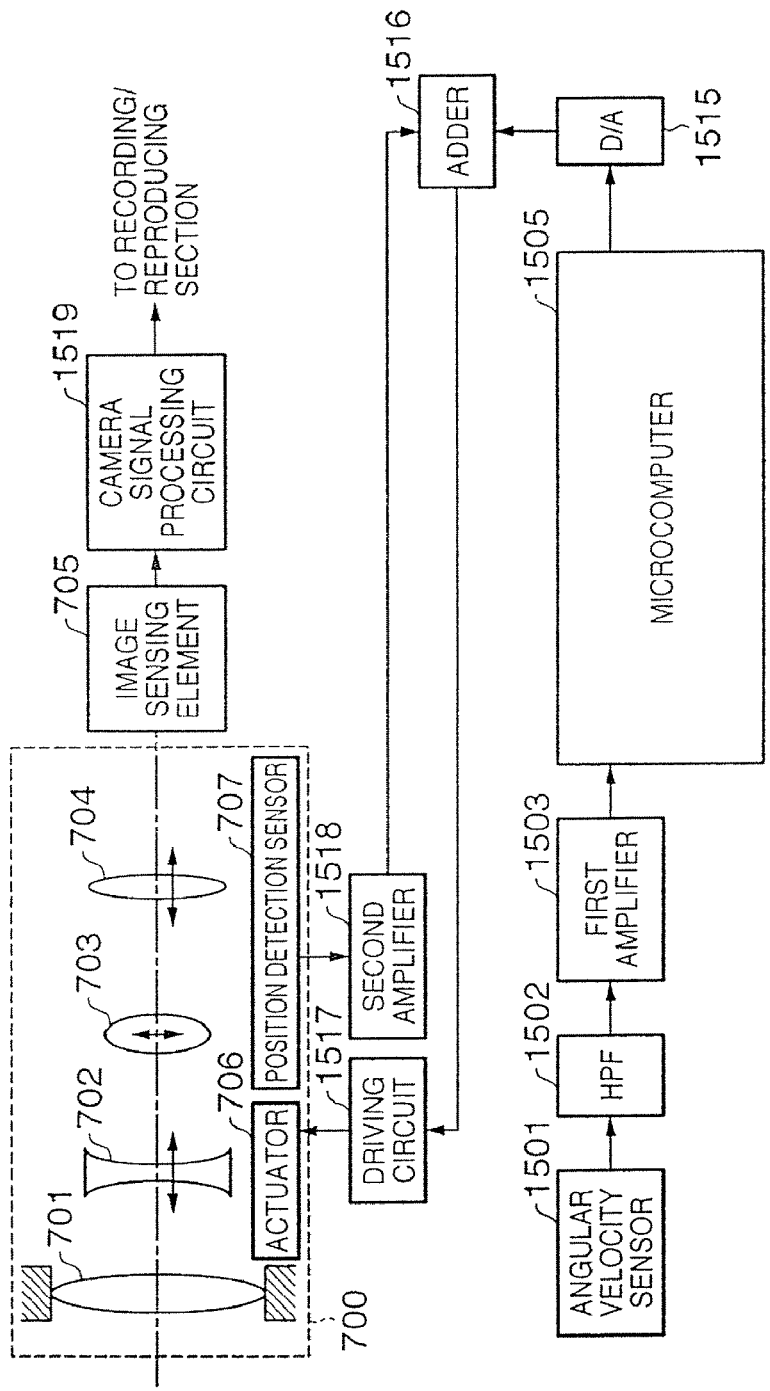
FIG. 11 is a block diagram showing a configuration of the conventional image sensing apparatus.
Figure 12:
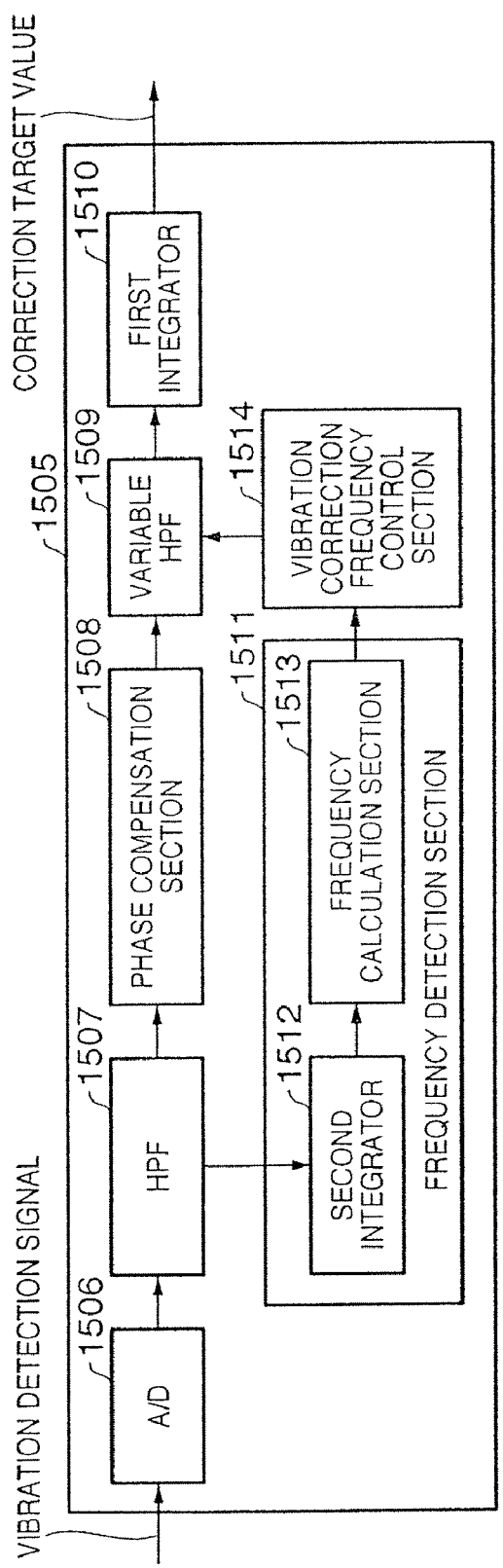
FIG. 12 is a block diagram showing a configuration of the microcomputer in FIG. 11.
Figure 13:
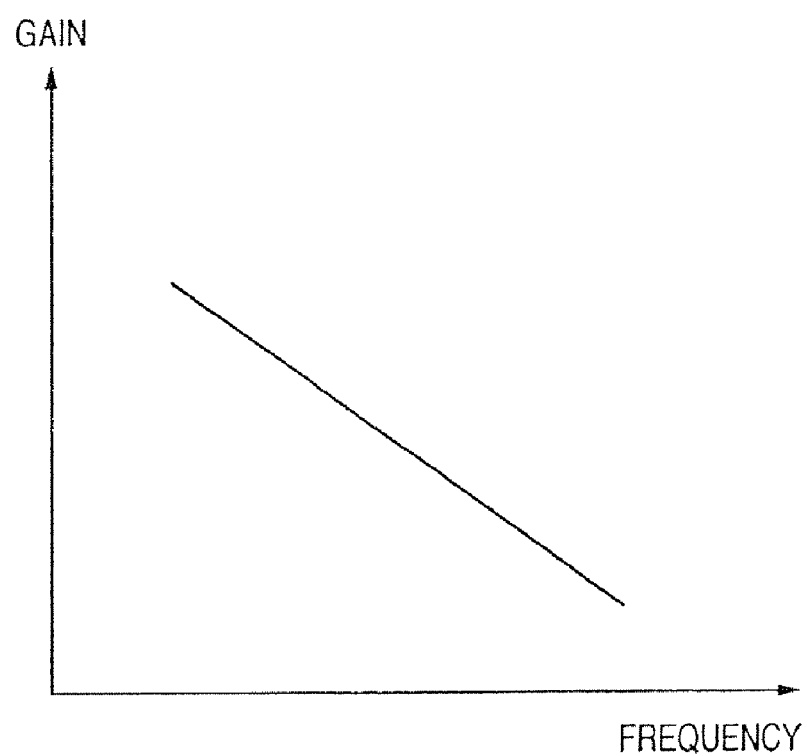
FIG. 13 is a characteristic diagram of the second integrator in FIG. 12.

Other components such as an angular velocity sensor 1501, HPF 1502, amplifier 1503, microcomputer 1505' and components included in the microcomputer 1505' such as processing sections 1506 to 1511, D/A converter 1515, adder 1516, driving circuit 1517, amplifier 1518, image sensing optical system 700, and components included in the image sensing optical system such as lens groups 701 to 704, actuator 706 and position detection sensor 707 of the shift lens, image sensing element 705 and camera signal processing circuit 1519 have the same configurations as those of the conventional example shown in FIG. 11 and FIG. 12, and therefore they are assigned the same reference numerals and duplicate explanations of their configurations and operations will be omitted.

However, for convenience's sake, the frequency detection section 1511 and a frequency detected by the frequency detection section 1511 in the conventional example are called a "first frequency detection section 1511" and "first frequency" in this first embodiment and further the HPF 1507 and frequency calculation section 1513 are called a "first HPF 1507" and "first frequency calculation section 1513."

The operations of the second HPF 1, third integrator 2, frequency calculation section 3 and vibration correction frequency control section 4 in the above described configuration will be explained.

The second HPF 1 is a high pass filter which cuts off frequency components lower than a predetermined cutoff frequency (fc1) from the vibration signal with no DC component which has passed through the first HPF 1507. More specifically, a value equal to or greater than a normal camera shake frequency band (e.g., 10 [Hz]) may be set as fc1, but optimum cutoff frequencies for respective apparatuses are preset. The high frequency vibration signal obtained at the second HPF 1 is subjected to integration processing by the third integrator 2 and converted to a high frequency displacement signal.

The second frequency calculation section 3 calculates a main frequency component included in the high frequency angular displacement signal through the processing similar to that explained in the conventional example. The frequency calculated by the second frequency calculation section 3 in particular becomes a second frequency limited to a frequency equal to or higher than fc1 because the amount of displacement of the low vibration frequency component of the vibration displacement signal obtained from the third integrator 2 is cut off by the fc1 of the second HPF 1.

Here, a typical input/output characteristic after the second HPF 1 and second frequency calculation section 3 will be explained with reference to FIG. 2 in brief.

Figure 2:
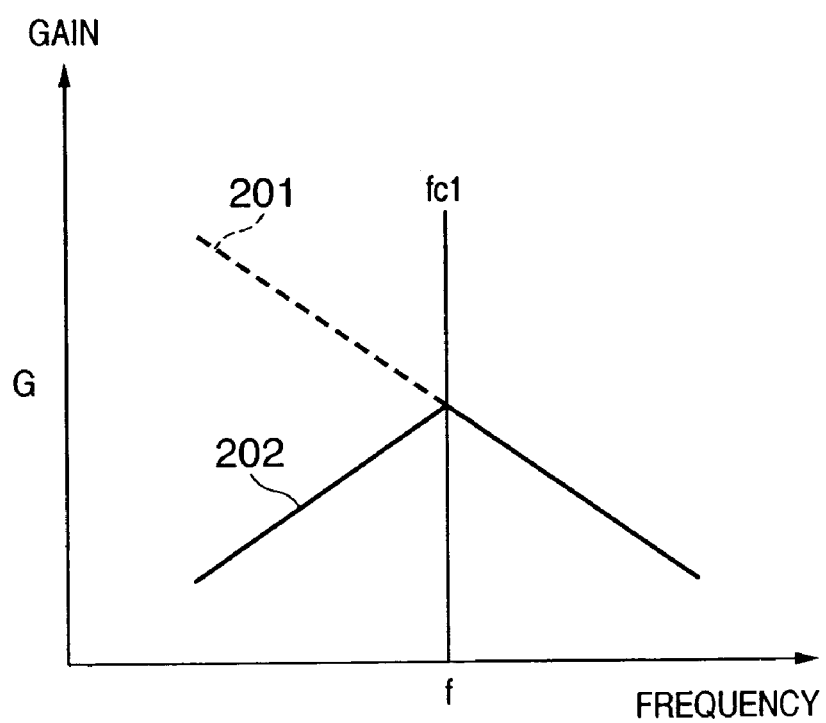
FIG. 2 is a characteristic diagram of a configuration made up of the second HPF and third integrator in FIG. 1.

FIG. 2 shows an input/output characteristic of the third integrator 2 and shows a frequency on the abscissa and a gain on the ordinate. In FIG. 2, reference numeral 201 expressed with a dotted line is an original integration characteristic and 202 shows an integration characteristic of a low frequency band which has attenuated by the second HPF 1. Since it is a characteristic with the gain of the low frequency band attenuated by the pass band restriction of the second HPF 1, the third integrator 2 outputs a signal of a large amplitude level equal to or higher than the cutoff frequency of the second HPF 1. With reference to FIG. 1 again, the function of the vibration correction frequency control section 4 will be explained.

The second frequency detected by the second frequency detection section 10 constructed of the third integrator 2 and the second frequency calculation section 3 is input to the vibration correction frequency control section 4. Then, the vibration correction frequency control section 4 determines the state of vibration exert on the apparatus based on the first frequency detected by the first frequency detection section 1511 and the second frequency detected by the second frequency detection section 10 and controls the frequency for correcting vibration.

More specifically, the vibration correction frequency control section 4 decides whether the vibration is of only a low frequency, only high frequency or a mixture of low frequency and high frequency and controls the cutoff frequency of the variable HPF 1509 so as to keep a specified value or make it variable.

This processing will be explained using the flow charts shown in FIGS. 3 and 4.

Figure 3:
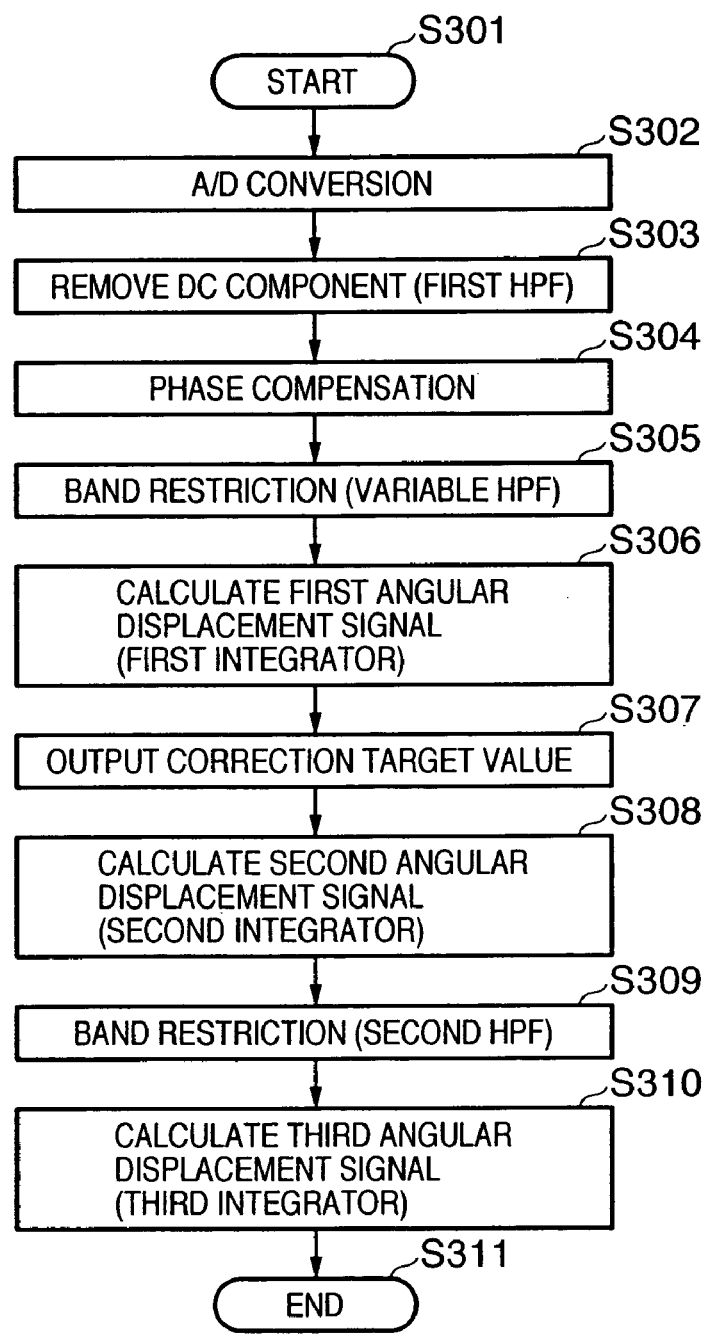
FIG. 3 is a flow chart showing processing executed in the microcomputer according to the first embodiment of the present invention.

FIG. 3 is a flow chart of vibration correction processing executed in the microcomputer 1505' and at step S301, processing of interrupting the overall processing of the microcomputer 1505' starts at a predetermined period (e.g., 1 [ms]) and a captured analog vibration detection signal is converted to a digital vibration detection signal by the A/D converter 1506 in step S302. Then, in next step S303, the first HPF 1507 removes the DC component generated through the A/D conversion. Then, in next step S304, the phase compensation section 1508 phase-compensates a predetermined band of the vibration detection signal whose DC component has been removed by the first HPF 1507. Then, in step S305, the variable HPF 1509 applies predetermined band restriction to the vibration detection signal undergone predetermined phase compensation by the variable HPF 1509.

Then, in step S306, the first integrator 1510 integrates a vibration detection signal undergone the predetermined band restriction to calculate the first angular displacement signal, and the process moves on to step S307, where the first angular displacement signal is output from the microcomputer 1505' as a correction target value. In this way, vibration correction is performed. In next step S308, the second integrator 1511 integrates the output of the first HPF 1507 and outputs a second angular displacement signal for detection of the first frequency. In next step S309, the second HPF 1 applies predetermined band restriction to the output of the first HPF 1507, the process moves on to step S310, where the third integrator 2 integrates the vibration detection signal undergone the band restriction in step S309 and outputs a third angular displacement signal for detection of the second frequency. Then in step S311, the microcomputer 1505' terminates interruption to all processing under its control.

Next, frequency detection and cutoff frequency setting processing of the variable HPF 1509 will be explained.

Figure 4:
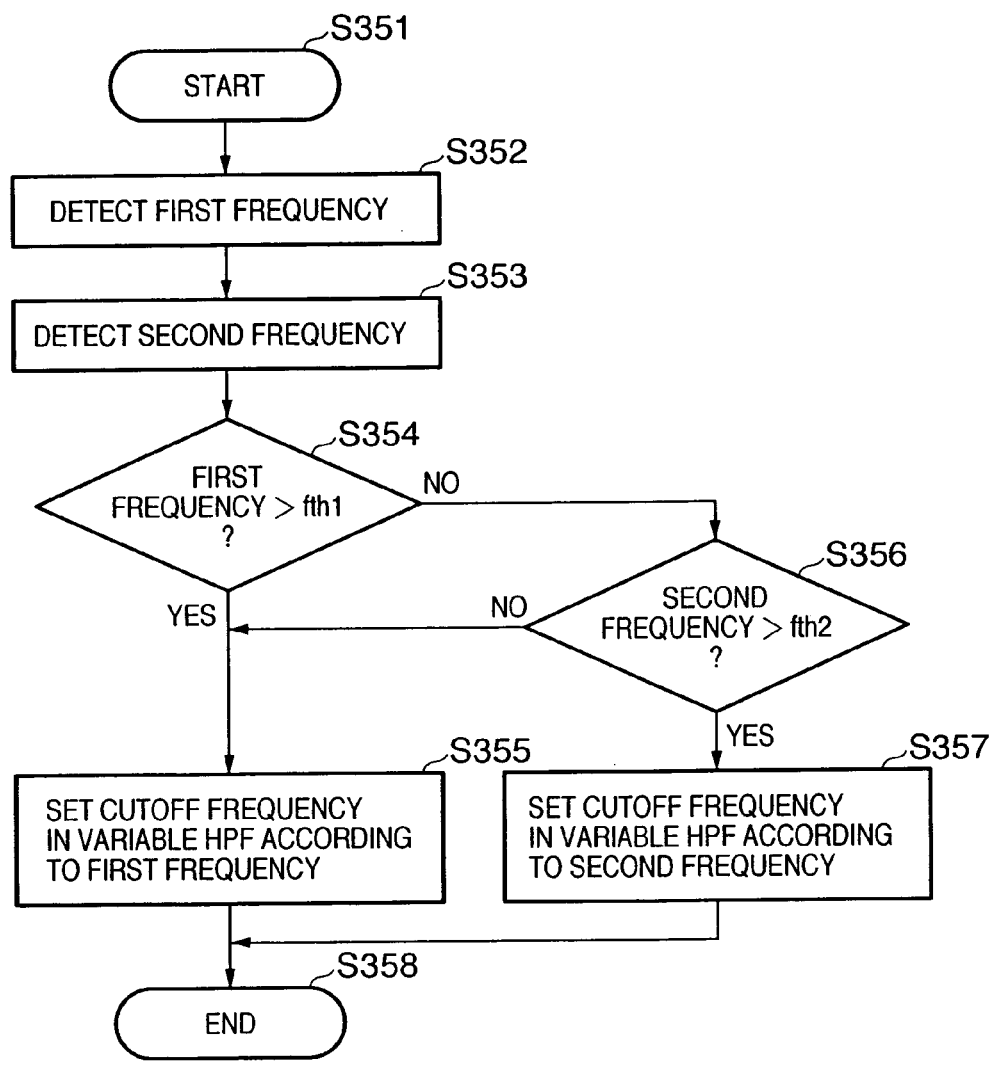
FIG. 4 is a flow chart showing frequency detection and cutoff frequency setting processing executed in the microcomputer according to the first embodiment of the present invention.

FIG. 4 is a flow chart of frequency detection and cutoff frequency setting processing for the variable HPF and this processing is carried out at a period different from the processing in FIG. 3 (e.g., 500 [ms]).

First, this processing will be roughly explained.

In FIG. 4, in step S351, frequency detection and cutoff frequency setting processing for the variable HPF are started and in step S352, the first frequency detection section 1511 detects the first frequency based on the second angular displacement signal calculated in step S308 in FIG. 3 and in next step S353, the second frequency detection section 10 detects the second frequency based on the third angular displacement signal calculated in step S319 in FIG. 3. Then, in next step S354, the first frequency is compared with a first threshold (fth1) and if the first frequency is greater, the process moves on to step S355 and sets a cutoff frequency of the variable HPF 1509 according to the first frequency. On the other hand, if the first frequency is equals to or smaller than the first threshold (fth1), the process moves onto step S356, where the second frequency is compared with a predetermined second threshold (fth2) and if the second frequency is equals to or smaller than the first threshold (fth2), that is, if it can be reconfirmed that the vibration is truly only of a low frequency, the process moves on to next step S355. On the contrary, if the second frequency is greater, the process moves on to step S357 and a cutoff frequency of the variable HPF 1509 according to the second frequency is set. Then in step S358, frequency detection and cutoff frequency setting for the variable HPF are ended.

Next, a detailed operation of the vibration correction frequency control section 4 of the above described processing will be explained using the same flow chart of FIG. 4.

Figure 14:
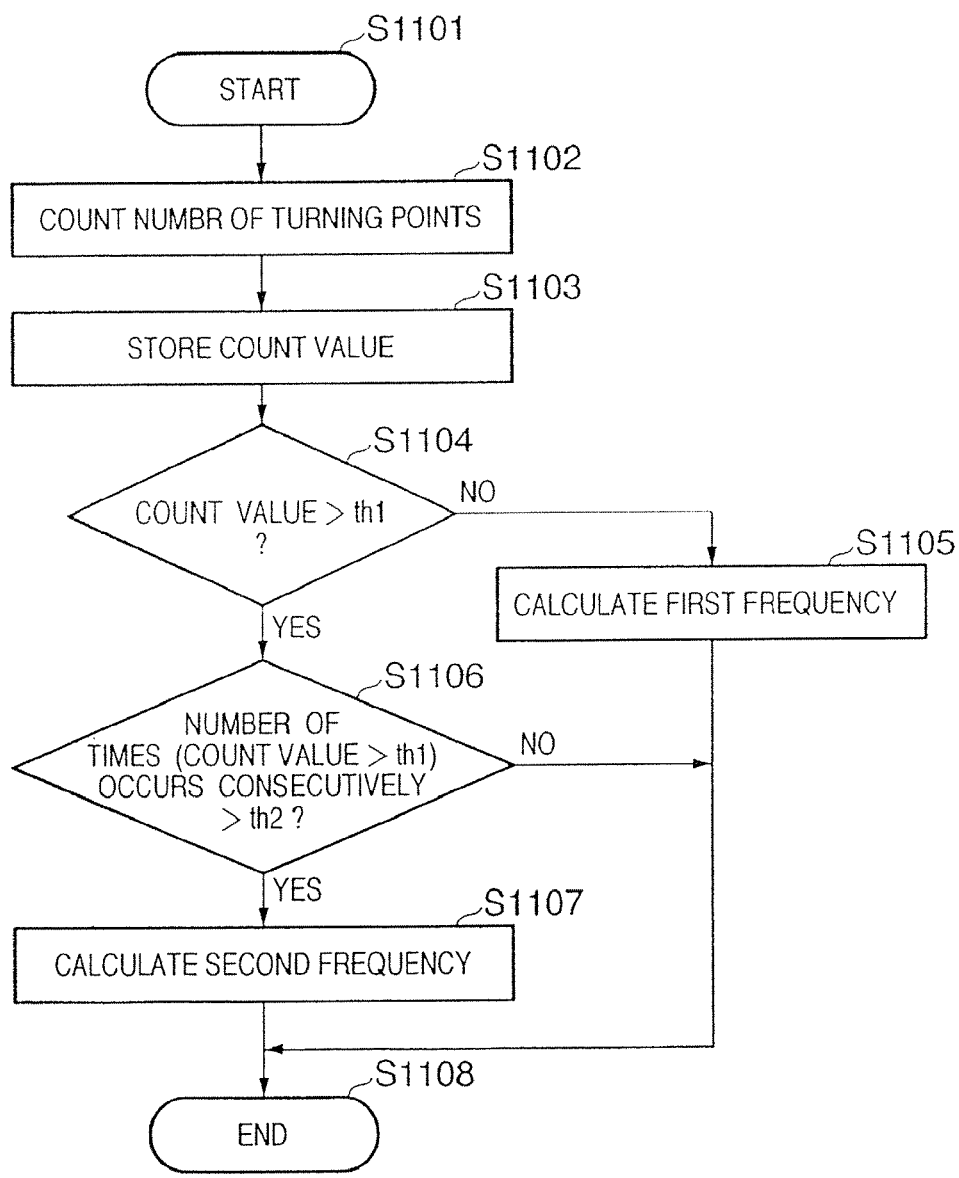
FIG. 14 is a flow chart showing the vibration frequency detection processing of the conventional image sensing apparatus.
Figures 15A, 15B:
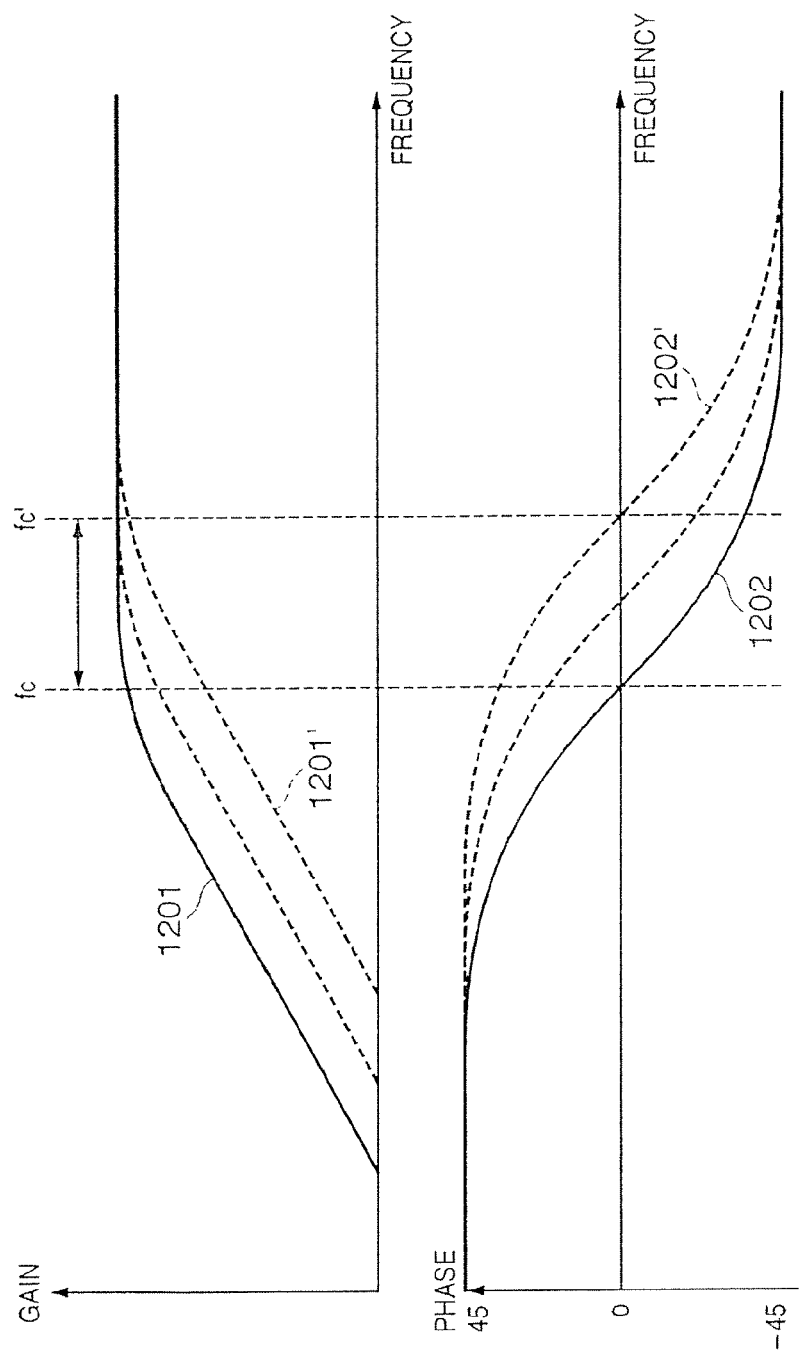
FIG. 15A and FIG. 15B are explanatory view for explaining vibration detection signal filtering processing of the conventional image sensing apparatus.

At step S351, frequency detection and cutoff frequency setting processing are started and a first frequency exerted on the apparatus is detected in step S352 and a second frequency exerted on the apparatus closer to the high frequency side than the first frequency is detected in step S353. These frequencies are used to decide the vibration state of the apparatus as described below, but the operation about the detection of this frequency is the same as the frequency detection operation of the conventional example explained with reference to FIG. 14, and thus details thereof will be omitted.

In next step S354, it is decided whether the first frequency detected by the first frequency detection section 1511 is higher than a predetermined first threshold (hereinafter referred to as "fth1") or not. A frequency in a normal camera shake frequency band can be set as fth1 (e.g., 6 [Hz]). If the above described comparison result shows that the first frequency is higher than fth1 (YES), the process moves on to step S355, where since the first frequency is higher than fth1, it is decided that the vibration exerted on the apparatus is vibration only of a high frequency higher than normal camera shake frequency. Accordingly, the cutoff frequency of the variable HPF 1509 is gradually shifted from the setting at the time of normal camera shake correction to the high frequency side based on the first frequency detected, to carry out vibration correction of the high frequency band. This improves the vibration suppression performance of the high frequency band and can reduce deterioration of resolution of the sensed image caused by the high frequency component.

On the other hand, if the comparison result in step S354 is that the first frequency is equals to or lower than fth1 (NO), since the first frequency is a low frequency equal to or lower than the normal camera shake frequency band and the process moves on to step S356 and a comparison is made between the second frequency detected by the second frequency detection section 10 enabling detection of higher frequencies than the conventional first frequency detection section 1511 with a predetermined second threshold (hereinafter referred to as "fth2"). A frequency equal to or higher than a normal camera shake frequency (e.g., 10 [Hz]) can be set as fth2 and it is checked here whether the vibration frequency exerted on the apparatus does not truly include a high frequency component or not. If this comparison result shows that the second frequency is equals to or lower than fth2 (No), the process moves on to step S355, where since the comparison result in step S354 above is equals to or lower than fth1 and the comparison result in step S356 above is equals to or lower than fth2, it is decided that the vibration state of the apparatus is only of a low frequency equal to or lower the normal camera shake frequency band and the cutoff frequency of the variable HPF 1509 is kept to the setting at the time of normal camera shake correction based on the first frequency. Therefore, normal camera shake correction is performed.

The setting of the cutoff frequency of the variable HPF so far is carried out by deciding whether the frequency of vibration exerted on the apparatus is a low frequency or high frequency. Next, processing for a case where a vibration of mixture of a low frequency and high frequency is exerted on the apparatus will be explained.

If, as the comparison result in step S354 above, the first frequency is equal to or lower than fth1 (NO), since the detected first frequency is a low frequency, the process moves on to step S356 and a comparison is made between the second frequency detected by the second frequency detection section 10 and fth2. Then, if the second frequency is greater than fth2 (YES), since the second frequency is a high frequency, the process moves on to step S357. Here, since the comparison result in step S354 indicates that the first frequency is equal to or lower than fth1, and the comparison result in step S356 above indicates that the second frequency is greater than fth2, it is decided that the vibration state of the apparatus is a mixture of a normal camera shake frequency band and high frequency band and the cutoff frequency of the variable HPF 1509 is gradually shifted from the setting at the time of normal camera shake correction to the high frequency side based on the detected second frequency to thereby perform vibration correction of the high frequency band. Thus, vibration correction of a high frequency band is given priority, and therefore the vibration suppression performance of the normal camera shake frequency band shows a tendency of declination, but the vibration suppression performance of the high frequency band improves, which reduces the deterioration of resolution of a sensed image caused by the high frequency component.

Thus, when the vibration correction frequency control section 4 detects only a low frequency from the state of vibration exerted on the apparatus (S354 S356→S355), normal vibration correction is carried out with the cutoff frequency of the variable HPF 1509 kept to a specified value. When only a high frequency is detected (S354→S355) or a low frequency and high frequency are detected simultaneously (S354→S356→S357), it is possible to correct vibration of the high frequency band by adaptively controlling the cutoff frequency of the variable HPF 1509 based on the detected frequency and reduce the deterioration of resolution of the sensed image caused by the high frequency component.

[Second Embodiment]

The first embodiment has described the case where according to the state of vibration exerted on the apparatus, when only a low frequency is detected, normal vibration correction is performed without controlling the cutoff frequency of the variable HPF 1509 and when only a high frequency is detected or when a low frequency and high frequency are detected simultaneously, the cutoff frequency of the variable HPF 1509 is controlled based on the detected frequency, thereby making it possible to correct vibration of the high frequency band. The second embodiment of the present invention is designed to perform control in such a way as to stop vibration correction control when a frequency exceeding a high frequency for which vibration correction is controllable is detected.

Figure 5:
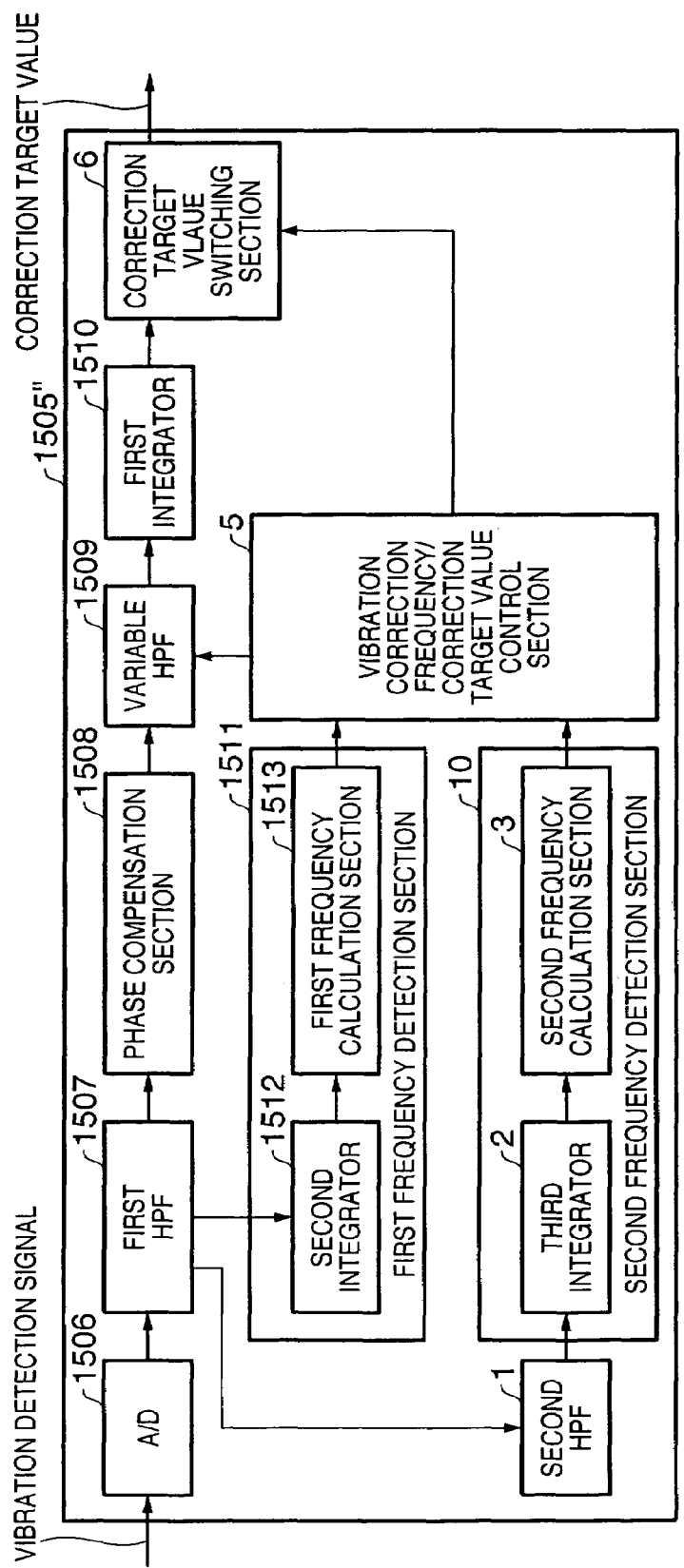
FIG. 5 is a block diagram showing a configuration of a microcomputer according to a second embodiment of the present invention.

FIG. 5 is a block diagram showing an internal configuration of a microcomputer 1505" according to the second embodiment of the present invention and the other same components as those in the conventional example in FIG. 12 and the first embodiment in FIG. 1 are assigned the same reference numerals and their explanations will be omitted.

In FIG. 5, reference numeral 5 denotes a vibration correction frequency/correction target value control section which decides the state of vibration from a vibration frequency of the apparatus and performs frequency control for correcting vibration or control of switching between vibration correction target values. Reference numeral 6 denotes a correction target value switching section which switches, based on the vibration detection signal, between a correction target value calculated based on the vibration detection signal and a predetermined correction target value.

Figure 6:
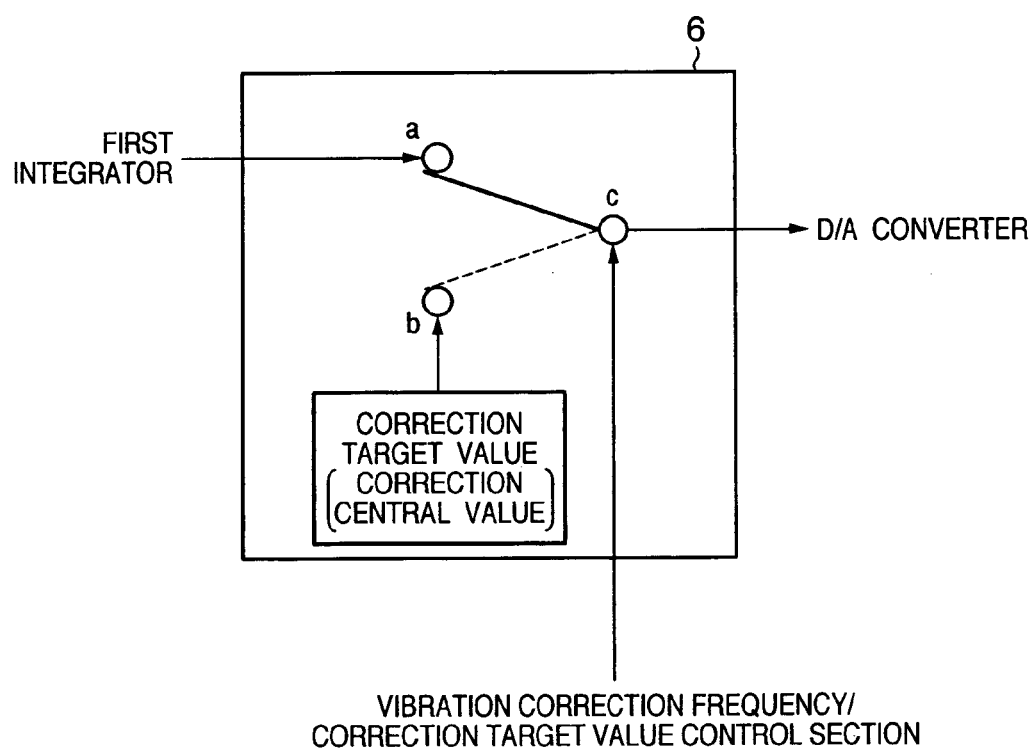
FIG. 6 is a block diagram of the correction target value switching unit in FIG. 5.

FIG. 6 shows a circuit configuration of the correction target value switching section 6.

In FIG. 6, the output of a first integrator 1510 is input to an a terminal of a changeover switch, while a correction target value (correction central value) is input to a b terminal of the changeover switch. Furthermore, this changeover switch supplies a control signal from the vibration correction frequency/correction target value control section 5 to the c terminal to thereby make it possible to select either the signal at the a terminal or b terminal and the selected output is output as a correction target value and input to a D/A converter 1515.

Then, the operation of the microcomputer 1505" having the above configuration will be explained.

As in the case of the above described first embodiment, the vibration correction frequency/correction target value control section 5 to which the frequencies detected by a first frequency detection section 1511 and second frequency detection section 10 are input operates to perform control in such a way that the cutoff frequency of the variable HPF 1509 is kept to a specified value depending on the situation of the detected frequency or shifted gradually from the specified value to the high frequency side or returned gradually from a state in which it has been shifted to the high frequency side to the specified value.

Figures 16A, 16B:
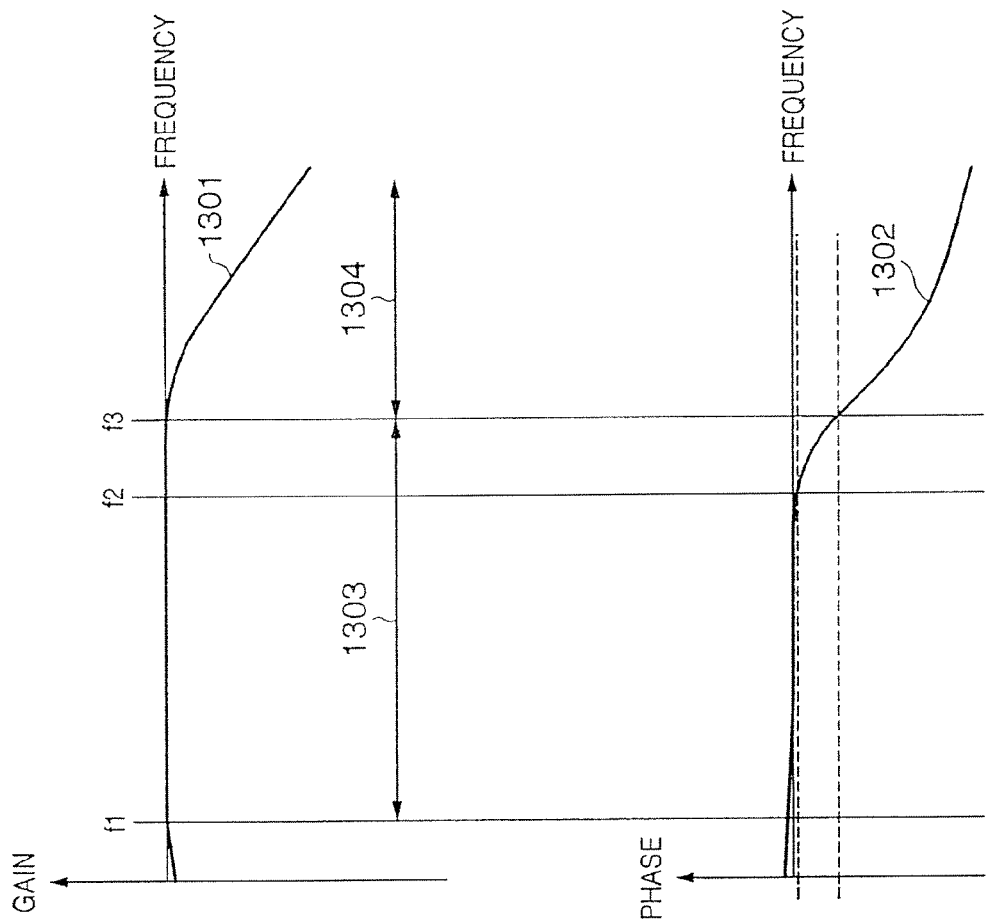
FIG. 16A and FIG. 16B are characteristic diagrams showing a general vibration correction characteristic.
Figure 18:
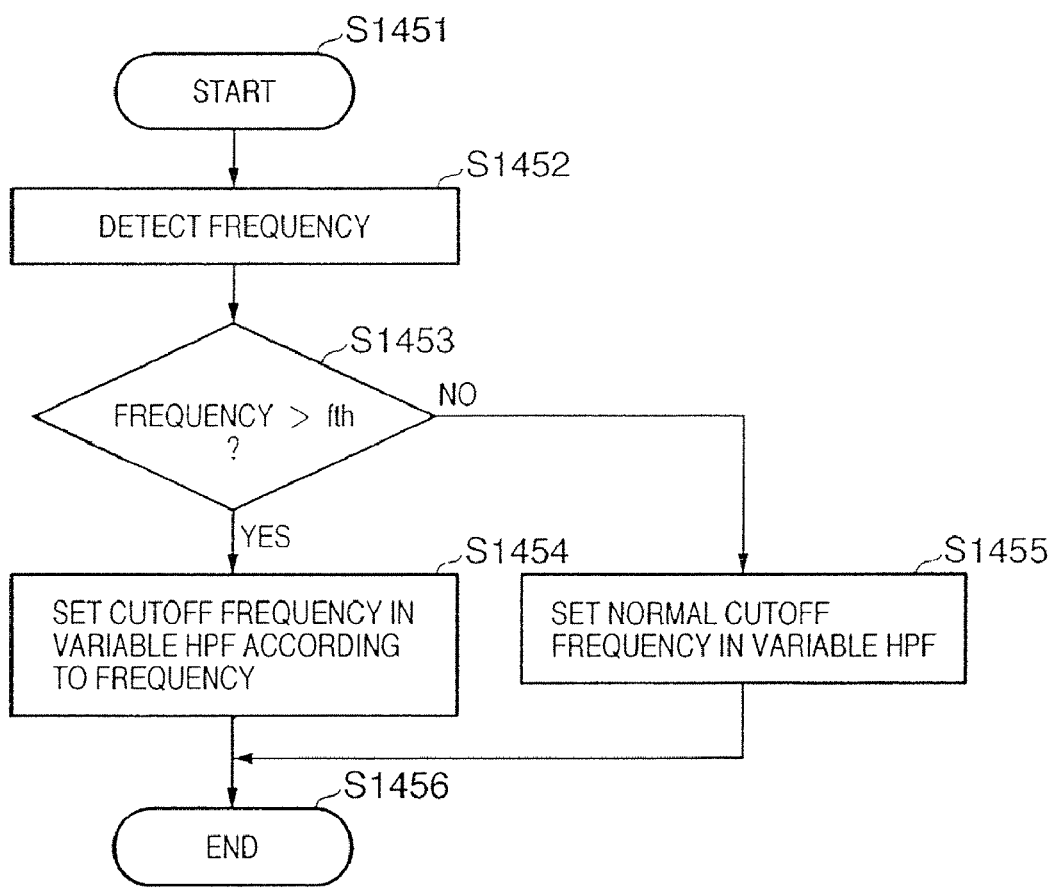
FIG. 18 is a flow chart showing the frequency detection and cutoff frequency setting processing executed in the microcomputer of the conventional image sensing apparatus.

However, when the high frequency vibration frequency detected by the first frequency detection section 1511 or the second frequency detection section 10 is a frequency in the frequency band 1304 shown in FIG. 16A and FIG. 16B where vibration correction is uncontrollable, even if the cutoff frequency of the variable HPF 1509 is shifted to the high frequency side through adaptive control, it is not possible to compensate for a phase delay of the high frequency band, vibration correction control is disabled and in the worst case, the phase may be inverted causing more vibration to the shift lens. As a measure to avoid such a phenomenon, the second embodiment performs control in such a way as to stop vibration correction control.

More specifically, when the vibration correction frequency/correction target value control section 5 decides that the first frequency or second frequency detected by the first frequency detection section 1511 or second frequency detection section 10 exceeds a third frequency threshold (fth3) set in the vibration correction frequency/correction target value control section 5, a control signal is output to the correction target value switching section 6. The third frequency threshold (fth3) is a lower limit of the frequency band 1304 shown in FIG. 16A and FIG. 16B for which vibration correction is uncontrollable (f3 in FIG. 16A and FIG. 16B).

When the control signal is input from the vibration correction frequency/correction target value control section 5, the correction target value switching section 6 switches from the correction target value calculated based on the vibration detection signal by the first integrator 1510 (aterminal of the changeover switch) to a predetermined correction target value (b terminal of the changeover switch) as shown by a dotted line in FIG. 6. The predetermined correction target value is an amplitude central value of the correction target value output from the microcomputer 1505 and the shift lens 703 is held to the center of the optical axis.

Next, the processing executed in the microcomputer 1505" according to the second embodiment of the present invention will be explained with reference to the flow charts in FIGS. 7 and 8.

Figure 7:
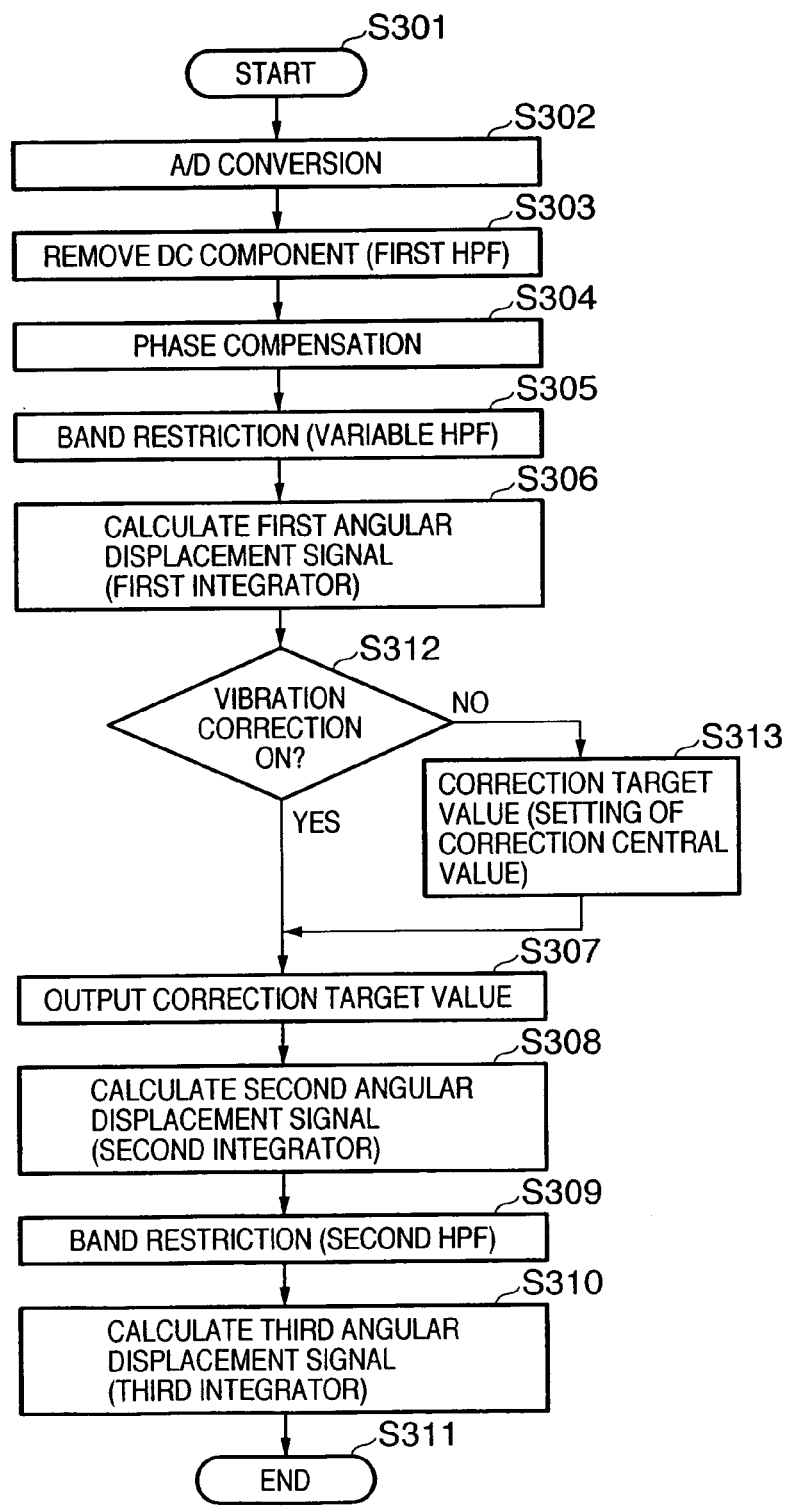
FIG. 7 is a flow chart showing processing executed in the microcomputer according to the second embodiment of the present invention.

FIG. 7 is a flow chart showing the vibration correction processing executed in the microcomputer 1505" which is the processing of interrupting the overall processing of the microcomputer 1505" at a predetermined period (e.g., 1 [ms]). The processing from steps S301 to S306 and processing from steps S307 to S311 are the same as the operation in steps in FIG. 3 explained in the above described first embodiment and their explanations will be omitted.

In FIG. 7, when the operation of the first integrator 1510 in step S306 finishes, the process moves on to step S312, where it is decided whether vibration correction should be performed or not according to the comparison result between the detected second frequency and a predetermined threshold (fth3) which will be described later, that is, whether vibration correction should be turned ON or OFF. If ON (YES), the process moves on to aforementioned step S307 and the correction target value to be output is set to the angular displacement signal calculated by the first integrator 1510. Whereas, if OFF (NO), the process moves on to step S313, where the correction central value is set to the correction target value to be output in step S307 which is the subsequent operation.

That is, since vibration correction is normally ON, the angular displacement signal calculated by the first integrator 1510 is output in step S307, but when a frequency exceeding the high frequency for which vibration correction is controllable is detected, the vibration correction control is stopped and the correction central value is set as the correction target value.

Next, frequency detection, setting of a variable HPF cutoff frequency and correction target value switching processing will be explained using the flow chart in FIG. 8. The processes which overlap with the above first embodiment are assigned the same step numbers and detailed explanations thereof will be omitted.

Figure 8:
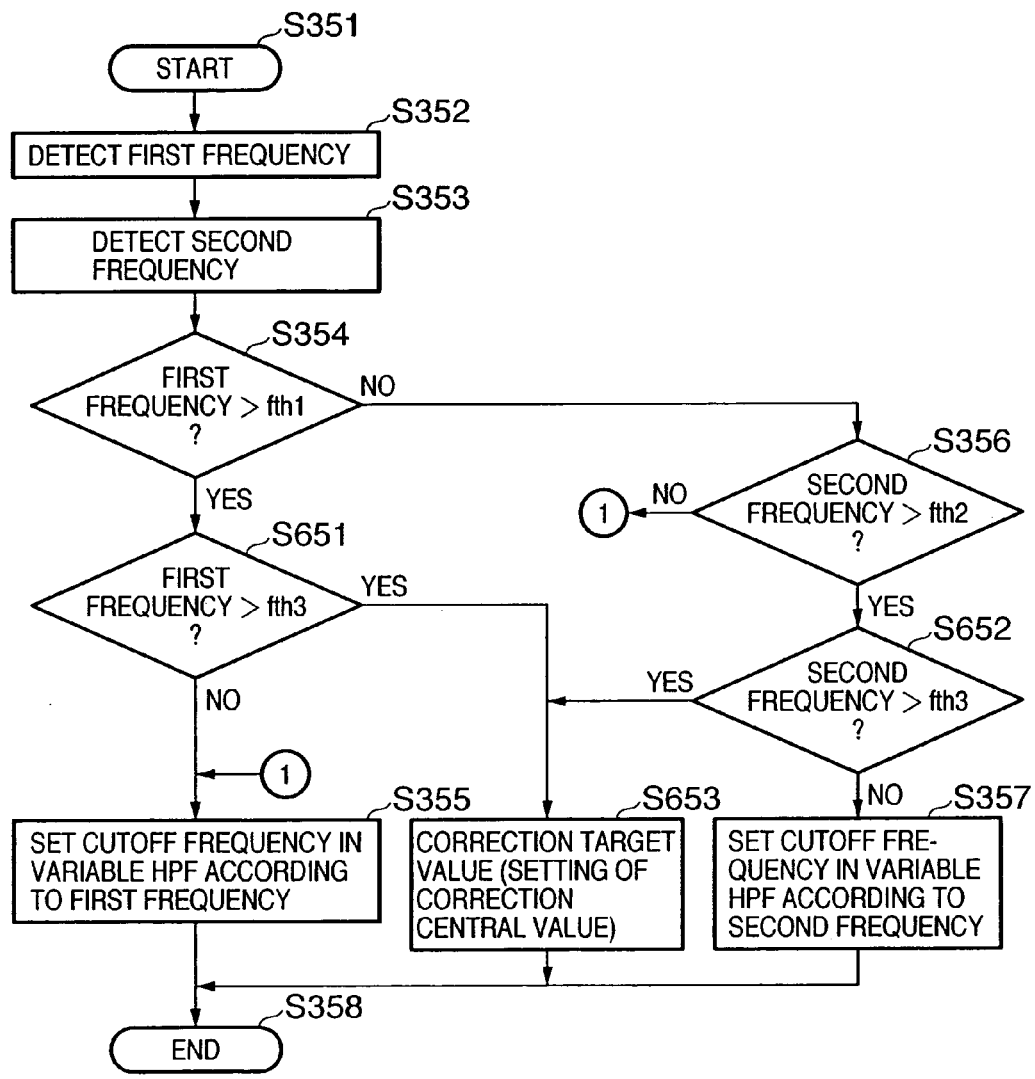
FIG. 8 is a flow chart showing frequency detection, cutoff frequency setting and correction target value switching processing executed in the microcomputer according to the second embodiment of the present invention.
Figure 9:
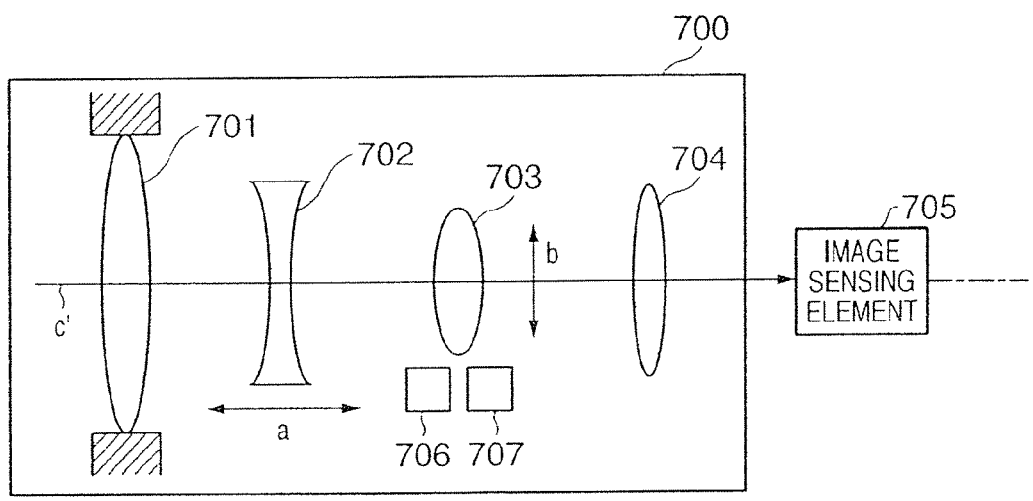
FIG. 9 schematically illustrates an arrangement of lenses of a conventional image sensing optical system.
Figure 10A:
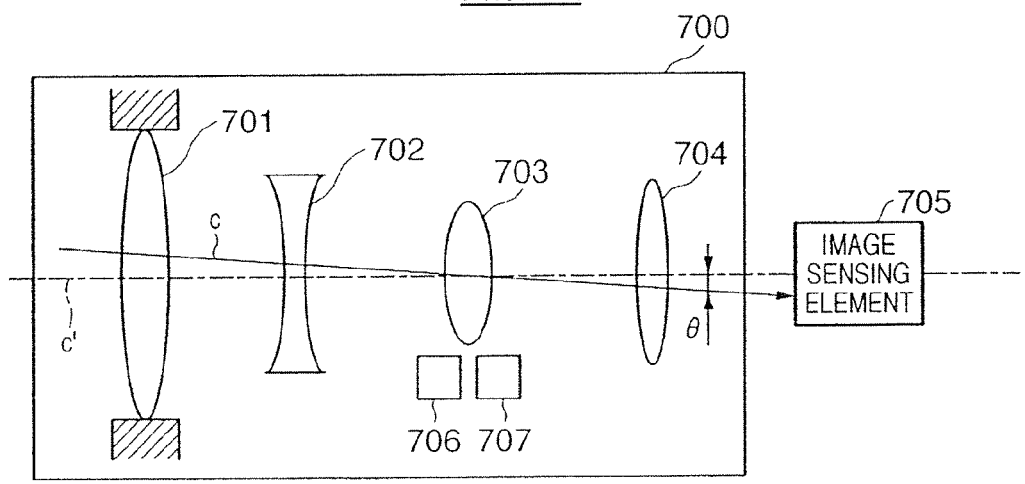
FIG. 10A and FIG. 10B illustrate a driving state of a shift lens when the optical axis is deviated from the center of the image sensing optical system.
Figure 10B:
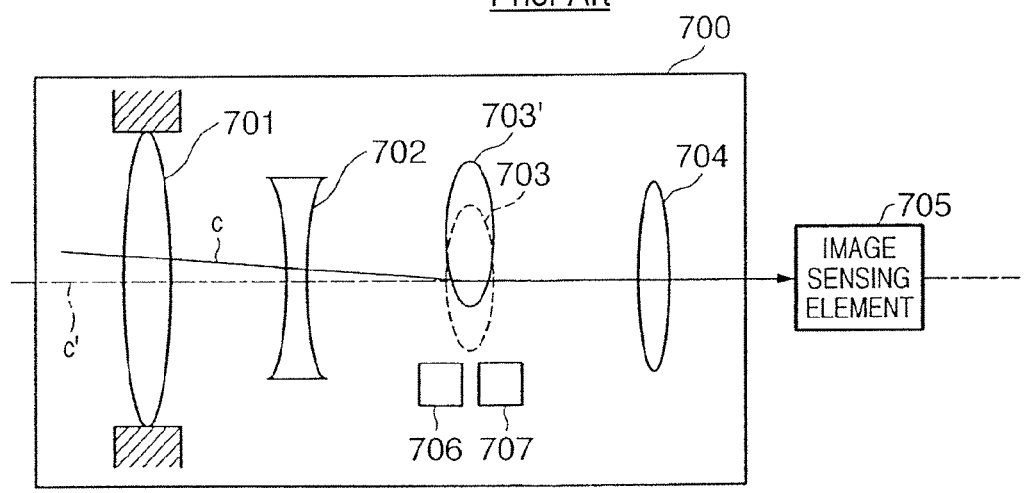

In FIG. 8, at step S351, frequency detection, setting of a cutoff frequency for the variable HPF and correction target value switching processing are started. First in step S352, the first frequency is detected and in step S353, the second frequency is detected. Then in next step S354, the first frequency detected by the first frequency detection section 1511 is compared with the first threshold (fth1) and if the first frequency is greater, the process moves on to step S651, where the first frequency is compared with the predetermined third threshold (fth3). If the first frequency is smaller or equal, the process moves on to step S355, where the cutoff frequency of the variable HPF 1509 is set based on the first frequency.

Furthermore, if the first frequency is decided to be smaller or equal in step S354, the process moves on to step S356, where the second frequency detected by the second frequency detection section 10 is compared with the predetermined second threshold (fth2). If this comparison result shows that the second frequency is smaller or equal, the process moves on to step S355, where the cutoff frequency of the variable HPF 1509 is set based on the first frequency.

Furthermore, when the second frequency is decided to be greater in step S356, the process moves on to step S652, where the second frequency is compared with the third threshold (fth3) and if the second frequency is smaller or equal, the process moves on to step S357, where the cutoff frequency of the variable HPF 1509 is set based on the second frequency.

Furthermore, when the first frequency or second frequency is decided to be greater than the predetermined third threshold (fth3) in step S651 or S652, the process moves on to step S653, where a correction central value is output as a predetermined correction target value as described above thereby a vibration correction value is set to OFF.

Next, the operation of the vibration correction frequency/correction target value control section 5 will be explained in detail with reference to the same flow chart in FIG. 8. The processing from steps S351 to S353, the first threshold (fth1) and second threshold (fth2) are the same as the aforementioned first embodiment and therefore explanations thereof will be omitted.

In step S354, the first frequency detected by the first frequency detection section 1511 is compared with a first threshold (hereinafter simply referred to as "fth1") and if the first frequency is higher than fth1 (YES), the detected frequency is a high frequency higher than the frequency of camera shake, and therefore the process moves on to step S651, where the first frequency is compared with a third threshold (hereinafter simply referred to as "fth3"). As fth3, a lower limit of a frequency band for which vibration correction is uncontrollable can be set (e.g., 30 Hz). When this comparison result shows that the first frequency is equal to or smaller than fth3 (NO), the first frequency is a high frequency for which vibration is correctable, and therefore the process moves on to step S355. In step S355, since the comparison result in step S354 indicates that the first frequency is higher than fth1 and the comparison result in step S651 indicates that the first frequency is equal to or lower than fth3, it is decided that the state of vibration of the apparatus is higher than the normal camera shake frequency and only a high frequency of the frequency band for which vibration correction is controllable and the vibration correction frequency/correction target value control section 5 thereby operates so as to correct vibration in the high frequency band by gradually shifting the cutoff frequency of the variable HPF 1509 from the setting at the time of normal camera shake correction to the high frequency side based on the first frequency detected by the first frequency detection section 1511. Therefore, it is possible to improve the effect of vibration suppression of the high frequency band and reduce deterioration of resolution of a sensed image caused by vibration of the high frequency.

Furthermore, when the comparison result in step S651 indicates that the first frequency is higher than fth3 (YES), it is in the band for which vibration correction is uncontrollable, and therefore the process moves on to step S653, where a signal is issued to the correction target value switching section 6 so as to select a predetermined correction target value as the vibration correction target value, or more specifically, select the central value of the amplitude of the correction target value output from the first integrator 1510 (that is, to select the b terminal in FIG. 6), and vibration correction control is thereby stopped. Since the central value is set as correction target value, the shift lens is held at the center of the optical axis and vibration correction is stopped. This makes it possible to reduce the deterioration of resolution of the sensed image due to a phase delay of the high frequency band where vibration correction is uncontrollable or suppress vibration of the vibration correcting means, thus preventing disturbances in the image.

Next, the case where the first frequency detected by the first frequency detection section 1511 is equals to or lower than fth1 (NO) in step S354 will be explained.

In this case, the process moves on to step S356 as in the case of the first embodiment, where it is decided whether there is any high frequency in the second frequency detected by the second frequency detection section 10 which is capable of detecting a high frequency more than the conventional frequency detection section 1511 by comparing the second frequency with fth2. If the comparison result shows that the second frequency is equal to or lower than fth2 (NO), the process moves on to step S355. Since the comparison result in step S354 indicates that the first frequency is equal to or lower than fth1 and the comparison result in step S356 indicates that the second frequency is equal to or lower than fth2, and therefore it is decided that the vibration state of the apparatus is only a low frequency of the normal camera shake frequency band and the setting at the time of normal camera shake correction is kept as the cutoff frequency of the variable HPF 1509 based on the first frequency as described above. Therefore, normal camera shake correction is performed.

Furthermore, when the second frequency is decided to be higher than fth2 (YES) in step S356 above, this means that a high frequency has been detected, and therefore the process moves on to step S652, where it is decided whether the second frequency is higher than fth3 or not. If the second frequency is equal to or lower than fth3 (NO), the process moves on to step S357. Then in step S357, since the comparison result in step S354, indicates that the first frequency is equal to or lower than fth1, the comparison result in step S356 indicates that the second frequency is higher than fth2 and the comparison result in step S652 indicates that the second frequency is equal to or lower than fth3, it is decided that the vibration state of the apparatus is a mixture of the camera shake frequency and a high frequency of the frequency for which vibration is correctable, and the vibration correction frequency/correction target value control section 5 operates so as to correct vibration of the high frequency band by gradually shifting the cutoff frequency of the variable HPF 1509 from the setting at the time of normal camera shake correction to the high frequency side based on the second frequency. Therefore, priority is given to vibration correction of the high frequency band, and therefore the effect of vibration suppression of the normal camera shake frequency band tends to reduce. However, since the effect of vibration suppression of the high frequency band improves through adaptive control, it is possible to reduce deterioration of resolution of a sensed image caused by the high frequency component.

Next, the case where the vibration frequency detected by the first frequency detection section 1511 is equals to or lower than fth1 (NO) in step S354 above, the second frequency detected by the second frequency detection section 10 is higher than fth2 (YES) in step S356 and the comparison result in step S652 indicates that the second frequency is higher than fth3 (YES) will be explained.

In this case, since a low frequency of the camera shake frequency band is mixed with a high frequency of the band for which vibration correction is uncontrollable, the process moves on to step S653, where vibration correction control is stopped by issuing a signal to the correction target value switching section 6 so as to set a predetermined correction target value as the vibration correction target value or more specifically to select a central value of the amplitude of a correction target value output from the first integrator 1510 (that is, the b terminal in FIG. 6 is selected). With the correction target value set to the central value, the shift lens is held at the center of the optical axis and vibration correction is stopped. Thus, it is possible to reduce deterioration of resolution of a sensed image due to a phase delay in the high frequency band for which vibration correction is uncontrollable or suppress vibration of the vibration correcting means and thereby avoid disturbance of the sensed image.

When only a low frequency is detected from the state of vibration exerted on the apparatus (S354→S356→S355), normal vibration correction is carried out without controlling the cutoff frequency of the variable HPF 1509 and when only a high frequency is detected (S354→S651→S355) or a low frequency and high frequency are detected simultaneously (S354→S356→S652→S357), it is possible to correct vibration of the high frequency band by adaptively controlling the cutoff frequency of the variable HPF 1509.

Furthermore, when the high frequency detected by the first frequency detection section 1511 or second frequency detection section 10 exceeds the vibration correction control range (S354→S651→S653 or S354→S356→S652→S653), it is possible to stop vibration correction by setting a correction central value as the correction target value, reduce deterioration of resolution of the sensed image or suppress vibration of the vibration correcting means. That is, it is possible to avoid disturbance of the sensed image.

The above described embodiments have described examples of constructing the vibration correcting means of a shift lens and driving circuit, but the present invention is not limited to this and the vibration correcting means can also be constructed of a variable apical angle prism (VAP) and its driving circuit.

The present invention is not limited to the above embodiments and various changes and modifications can be made within the spirit and scope of the present invention. Therefore to apprise the public of the scope of the present invention, the following claims are made.

What is claimed is:

1. An image sensing apparatus comprising:
   a vibration detector that detects vibration of the apparatus;
   a vibration correction unit that corrects vibration of an image caused by vibration of said apparatus; and
   a control unit that calculates a vibration correction signal based on a vibration detection signal from said vibration detector and controls said vibration correction unit, wherein said control unit comprises:
     a first detection unit that detects whether a first frequency obtained from said vibration detection signal and used for calculating the vibration correction signal falls within a first frequency band which is equal to or lower than a predetermined frequency;
     a second detection unit that detects whether a second frequency obtained from said vibration detection signal and used for calculating the vibration correction signal falls within a second frequency band exceeding said predetermined frequency or not;
     a variable high frequency band pass unit that changes the pass band for the vibration detection signal on the high frequency side depending on cases 1) where the first frequency falls within the first frequency band and the second frequency does not fall within the second frequency band, 2) where the first frequency does not fall within the first frequency band and the second frequency falls within the second frequency band, and 3) where the first frequency falls within the first frequency band and the second frequency falls within the second frequency band simultaneously; and
     a calculation unit that calculates the vibration correction signal from a vibration frequency of the vibration detection signal passed through said variable high frequency band pass unit and outputs the vibration correction signal to said vibration correction unit.

2. The image sensing apparatus according to claim 1, wherein when at least the second frequency falls within the second frequency band, said variable high frequency band pass unit shifts the pass band to the high frequency side compared to a case where the first frequency falls within the first frequency band and the second frequency does not fall within the second frequency band.

3. The image sensing apparatus according to claim 1 further comprising a vibration correction signal switching unit that prevents the vibration correction signal calculated by said calculation unit from being output to said vibration correction unit and outputs a predetermined vibration correction signal to said vibration correction unit when at least one of the first and second frequency falls within a third frequency band for which vibration correction is uncontrollable.

4. The image sensing apparatus according to claim 3, wherein when at least the second frequency falls within the second frequency band, said variable high frequency band pass unit shifts the pass band to the high frequency side compared to a case where the first frequency falls within the first frequency band and the second frequency does not fall within the second frequency band.

5. The image sensing apparatus according to claim 1, wherein said vibration correction unit corrects vibration of the image on the image plane by optically deflecting the optical axis.

6. The image sensing apparatus according to claim 5, wherein said vibration correction unit includes a shift lens and its driving circuit.

7. The image sensing apparatus according to claim 5, wherein said vibration correction unit includes a variable apical angle prism and its driving circuit.

* * * * *